United States Patent
Iizuka et al.

(10) Patent No.: US 8,187,695 B2
(45) Date of Patent: May 29, 2012

(54) SHAPING SHEET, RESIN DECORATIVE MATERIAL AND METHOD OF PRODUCING THE SAME

(75) Inventors: Takashi Iizuka, Saitama (JP); Yoichi Hirota, Okayama (JP); Kenichi Tachihara, Chiba (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 615 days.

(21) Appl. No.: 11/529,345

(22) Filed: Sep. 29, 2006

(65) Prior Publication Data

US 2007/0231583 A1 Oct. 4, 2007

(30) Foreign Application Priority Data

Sep. 30, 2005 (JP) ................. 2005-288461
Sep. 30, 2005 (JP) ................. 2005-288593
Sep. 30, 2005 (JP) ................. 2005-288596
Sep. 30, 2005 (JP) ................. 2005-289272
Mar. 31, 2006 (JP) ................. 2006-099763

(51) Int. Cl.
*B44C 1/04* (2006.01)
*B32B 5/16* (2006.01)
*B32B 7/10* (2006.01)

(52) U.S. Cl. ............... 428/195.1; 428/325; 428/336; 428/332; 428/405; 428/423.7

(58) Field of Classification Search ........... 106/31.13, 106/31.65
See application file for complete search history.

(56) References Cited

U.S. PATENT DOCUMENTS 5,656,701 A * 8/1997 Miyamoto et al. ............ 525/453
6,277,929 B1 * 8/2001 Kitahara et al. ........ 525/440.072
6,596,805 B1 * 7/2003 Nigam et al. ................. 524/527
2001/0049022 A1 * 12/2001 Takeuchi et al. ............ 428/423.1
2003/0113520 A1 * 6/2003 Takahashi et al. ............ 428/201
2003/0129369 A1 * 7/2003 MacQueen et al. .......... 428/204
2005/0208275 A1 9/2005 Abe et al.

(Continued)

FOREIGN PATENT DOCUMENTS

JP 64-087315 3/1989

(Continued)

OTHER PUBLICATIONS

JP 2003-340975 Machine Translation. Retrieved Sep. 8, 2011.*

(Continued)

*Primary Examiner* — David Sample
*Assistant Examiner* — Prashant J Khatri
(74) *Attorney, Agent, or Firm* — Antonelli, Terry, Stout & Kraus, LLP.

(57) ABSTRACT

The present invention provides a shaping sheet that includes a base material having at least an ink layer provided on the whole surface thereof and a surface shaping layer that is present on the ink layer, contacts the ink layer, and covers the whole surface of the ink layer, in which the surface shaping layer is a crosslinked and cured product of a curable resin composition and the surface shaping layer has a concavoconvex pattern on a surface thereof. There can be obtained: a shaping sheet that has a fine concavoconvex pattern, allows elaborated shaping with a high-grade feeling, and has excellent releasability; a shaping sheet having excellent design properties and releasability that can readily control a lustrous portion and a matted portion; and further a shaping sheet whose surface is free of contamination by impurities separated out of the base material even when it is repeatedly used.

16 Claims, 10 Drawing Sheets

U.S. PATENT DOCUMENTS

2007/0116933 A1    5/2007    Kobayashi et al.

FOREIGN PATENT DOCUMENTS

| | | |
|---|---|---|
| JP | 01-320156 | 12/1989 |
| JP | 02-131175 | 5/1990 |
| JP | 04-219168 | 8/1992 |
| JP | 05-092484 | 4/1993 |
| JP | 05-138736 | 6/1993 |
| JP | 05-139095 | 6/1993 |
| JP | 05-147185 | 6/1993 |
| JP | 05-261867 | 10/1993 |
| JP | 06-008254 | 1/1994 |
| JP | 06-344439 | 12/1994 |
| JP | 07-052239 | 2/1995 |
| JP | 07-164519 | 6/1995 |
| JP | 07-276569 | 10/1995 |
| JP | 07-276570 | 10/1995 |
| JP | 2000-211089 | 8/2000 |
| JP | 2003-205589 | 7/2003 |
| JP | 2003340975 A * | 12/2003 |
| JP | 2004-090319 | 3/2004 |
| JP | 2006-281631 | 10/2006 |

OTHER PUBLICATIONS

Japanese Official Action dated Apr. 12, 2011, for JP Application No. 2006-099763.

Japanese Official Action dated Jun. 7, 2011, for JP Application No. 2005-288596.

JP Official Action dated Nov. 16, 2010, for JP Application No. 2005-289272.

JP Official Action dated Feb. 8, 2011, for JP Application No. 2005-289272.

JP Official Action dated Nov. 16, 2010, for JP Application No. 2005-288593.

JP Official Action dated Feb. 15, 2011, for JP Application No. 2005-288593.

Japanese Official Action dated Aug. 9, 2011, for JP Application No. 2005-288461.

Japanese Official Action dated Feb. 14, 2012, for JP Application No. 2006-099763.

* cited by examiner

【Fig.1】
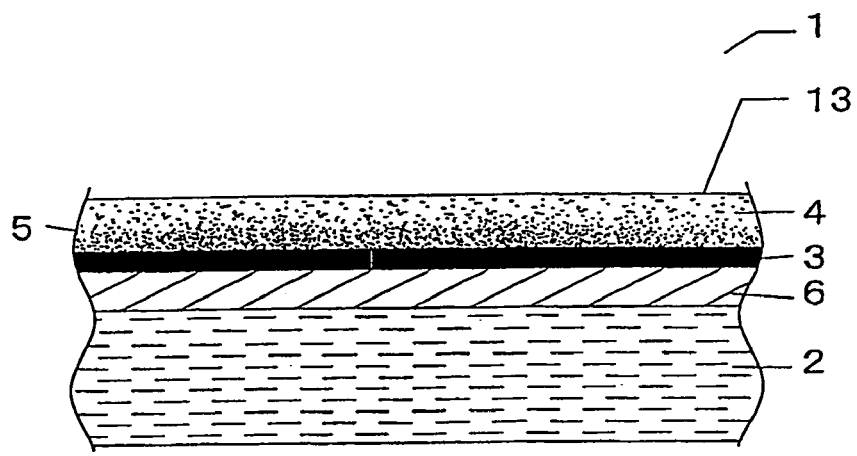
【Fig.2】
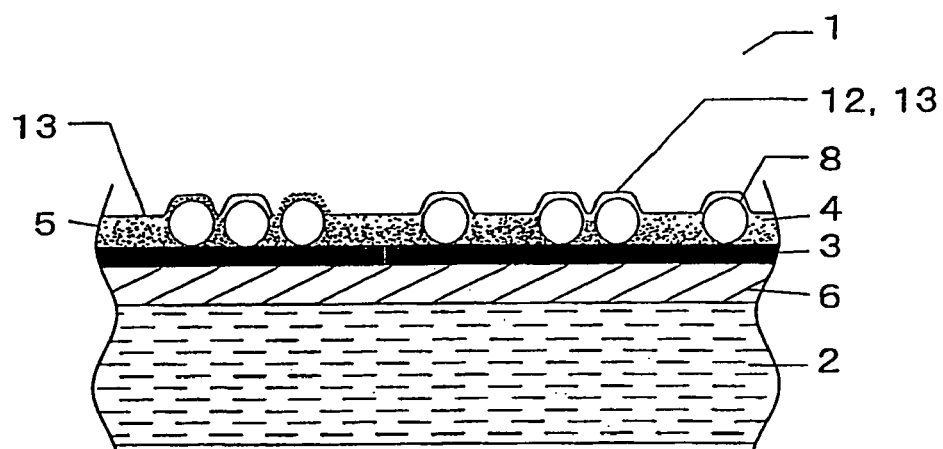

[Fig. 3]
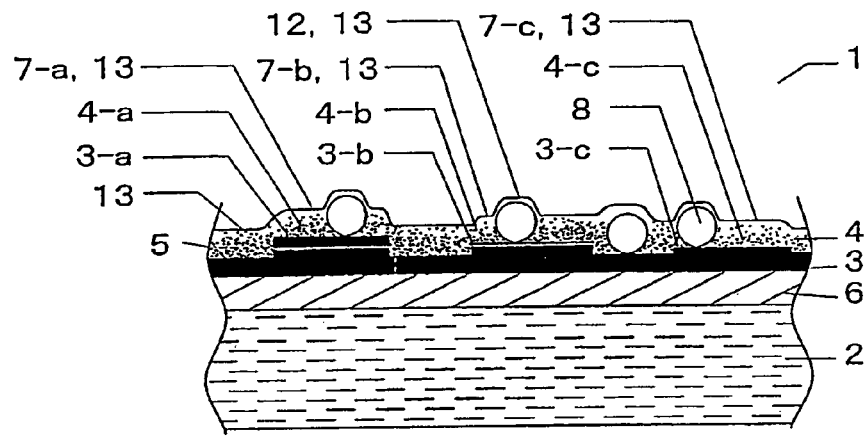
[Fig. 4]
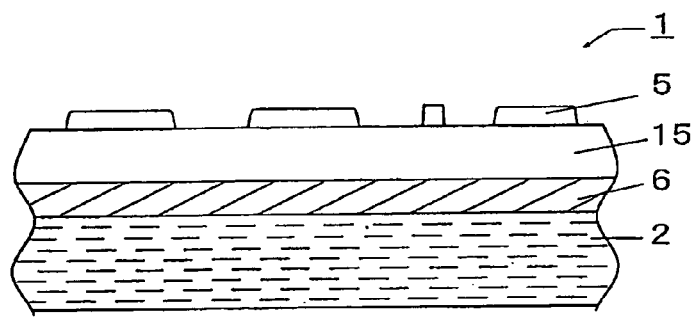

[Fig.5]
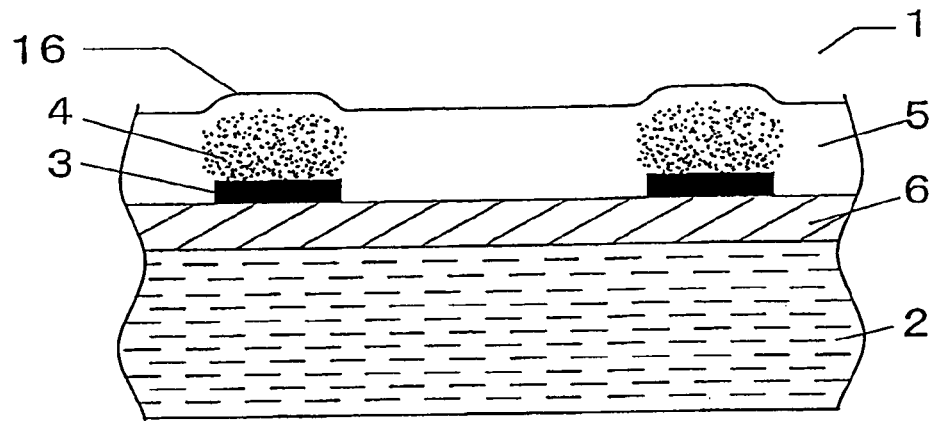
[Fig.6]
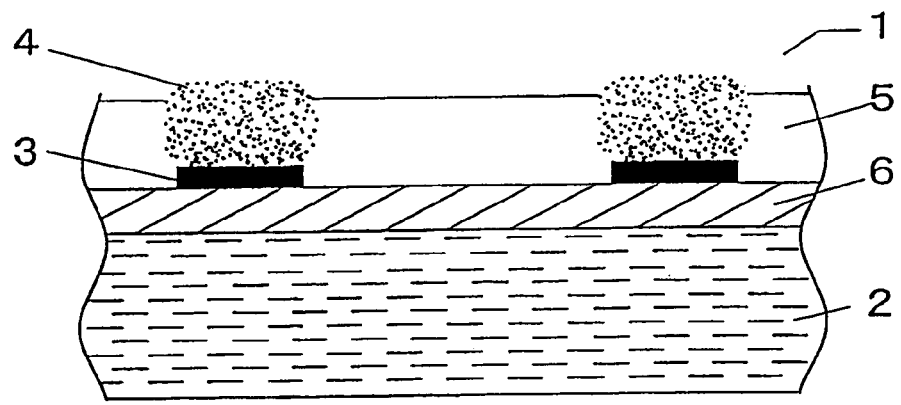

[Fig.7]
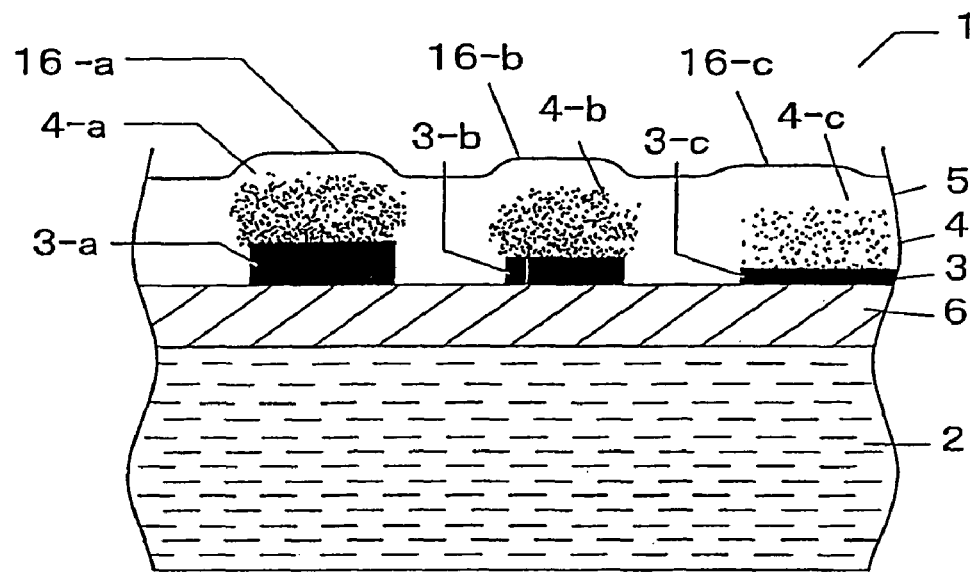
[Fig.8]
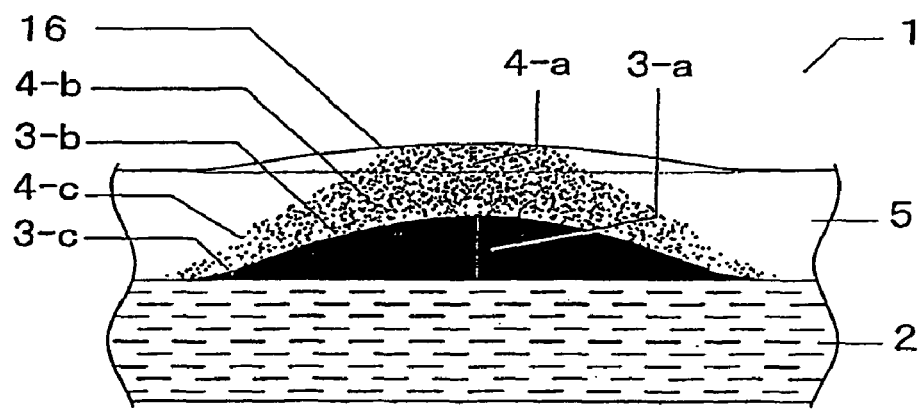

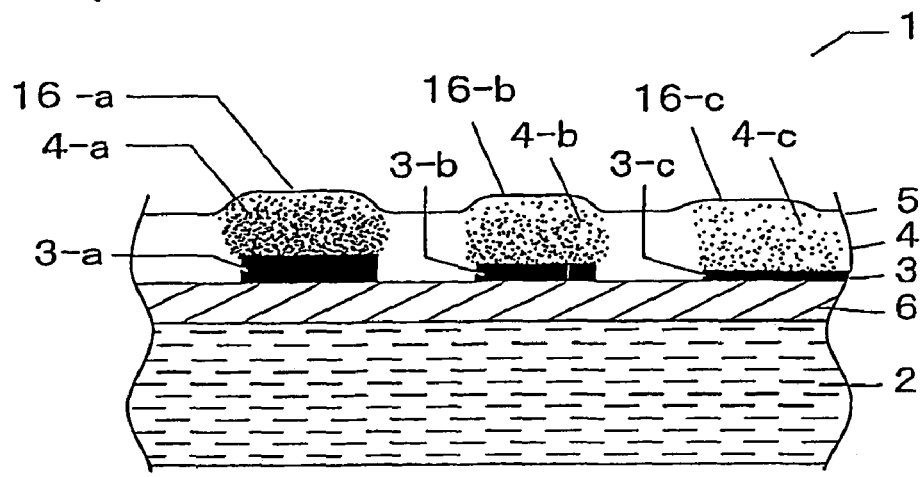
[Fig.9]
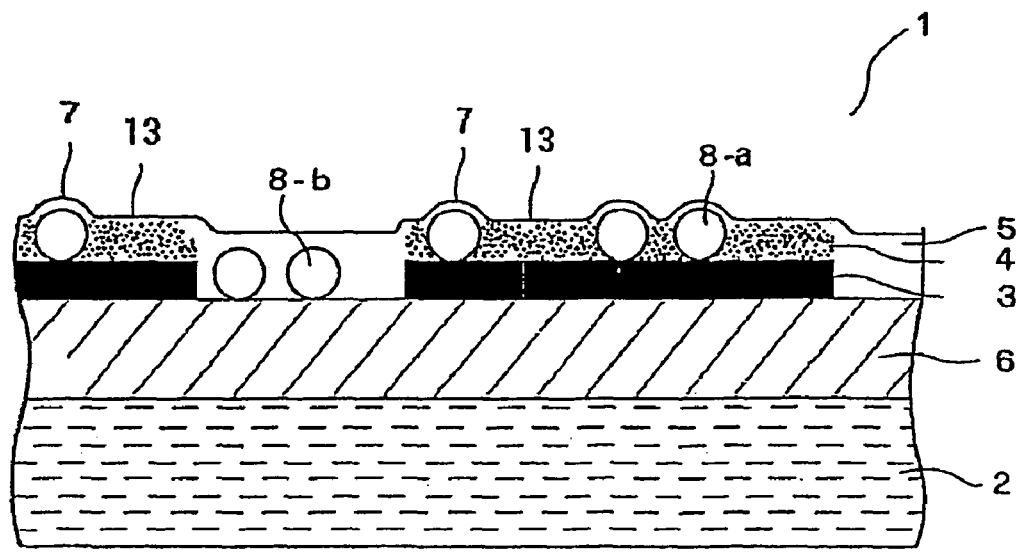
[Fig.10]

[Fig.11]
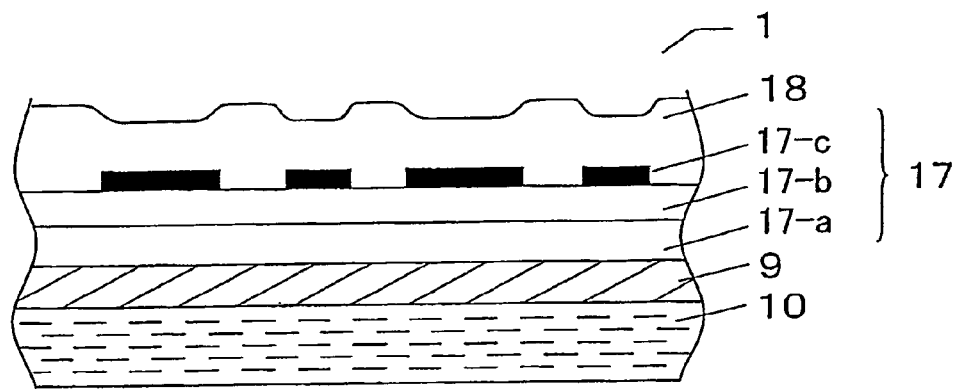
[Fig.12]
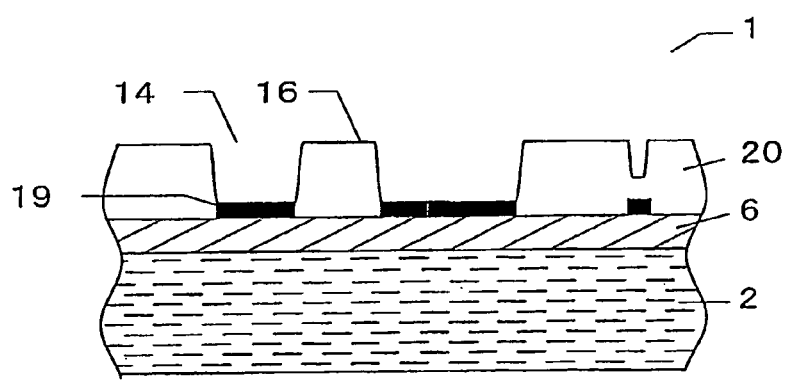

[Fig. 13]
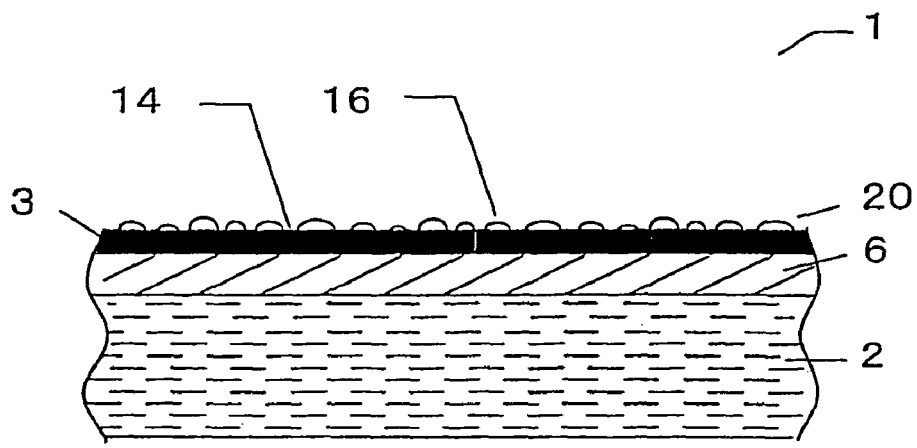
[Fig. 14]
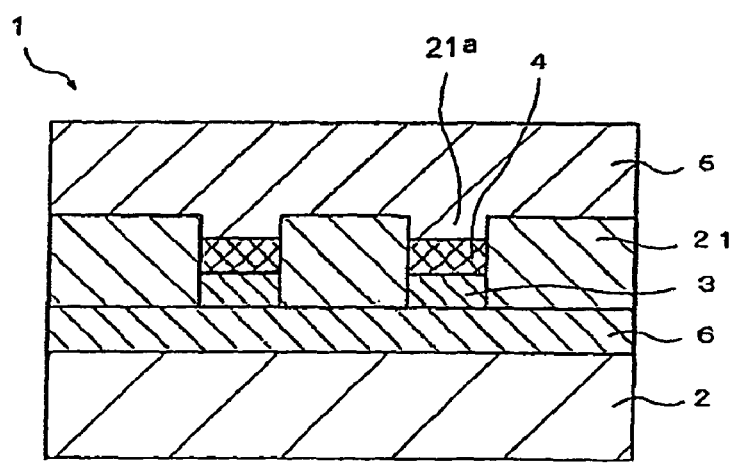

[Fig.15]
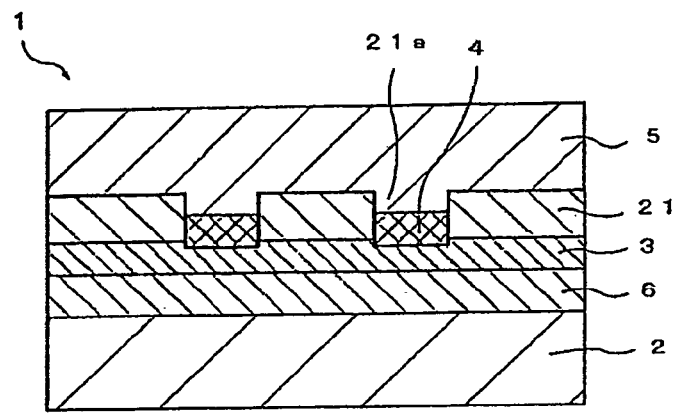
[Fig.16]
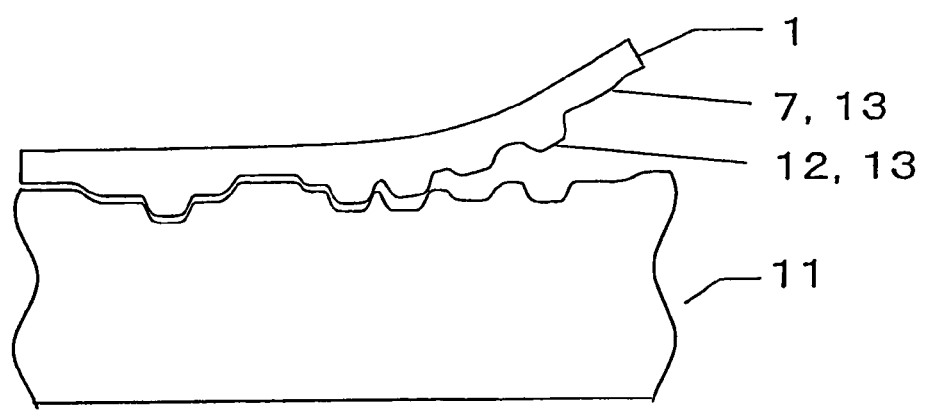

[Fig.17]
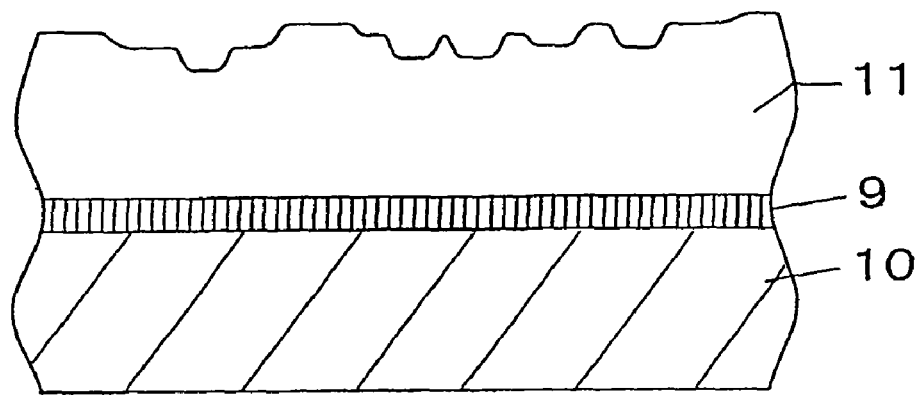
[Fig.18]
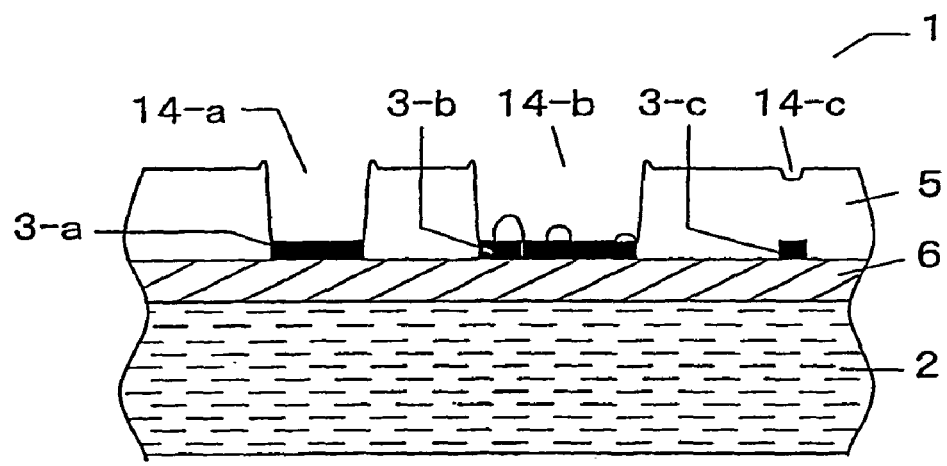

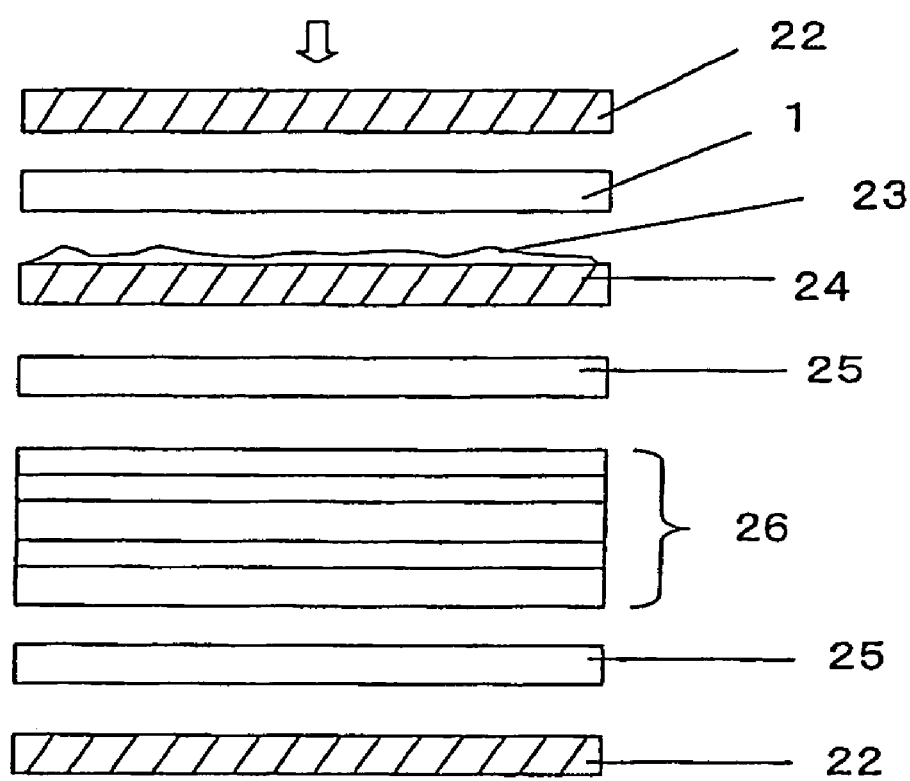

SHAPING SHEET, RESIN DECORATIVE MATERIAL AND METHOD OF PRODUCING THE SAME

TECHNICAL FIELD

The present invention relates to a shaping sheet that has a fine concavoconvex pattern, allows elaborated shaping with a high-grade feeling, and has excellent releasability, to a shaping sheet that has excellent design properties and that can readily control a lustrous part and a matted part, to a resin decorative board which is obtained using such a shaping sheet, and to a method of producing a decorative board including shaping an object to be shaped using a shaping sheet.

BACKGROUND ART

Construction materials that are widely used as house appliances and interior materials such as furniture, a top panel of a desk, various kinds of counters, and doors generally include decorative boards obtained by shaping synthetic resin materials, for example, melamine resin decorative boards.

Conventionally, thermosetting resin decorative boards each having a concavoconvex pattern on the surface thereof include those having formed thereon a concavoconvex pattern using an emboss mold or a concavoconvex resin sheet and those having formed thereon a concavoconvex pattern using a shaping sheet. However, when the emboss mold with a concavoconvex pattern is used, it is necessary to subject the mold to surface treatment such as blasting and etching, so there will be restrictions to the concavoconvex pattern and elaborateness of the design pattern. Further, when the thermosetting resin decorative board is produced, an expensive mold plate and a spare mold plate are needed, which increases labor and cost for the production of the decorative board, thus largely increasing the production cost and making the product expensive.

Further, in the case of the concavoconvex resin sheet, the thermosetting resin decorative board becomes difficult to be peeled after curing of the resin, and as a result, an aluminum foil, a polypropylene film, or the like must be inserted between the mold plate and the resin sheet. Accordingly, it is very difficult to form a fine concavoconvex pattern with sharpness.

Incidentally, with a recent consumer orientation toward high grade articles, a high-grade feeling is demanded for house appliances such as furniture, desks, various kinds of counters and doors, or interior materials and hence, decorative boards used therefor are demanded to have an appearance that afford a high-grade feeling. Accordingly, it has become important to impart texture to such articles and various methods of imparting a fine concavoconvex pattern to a decorative board have been proposed.

For example, a shaping sheet has been proposed which includes a base material sheet having formed on a surface thereof a concavoconvex pattern with an ionization radiation-curable resin, in which the shaping sheet has a crosslink density sufficient not to cause cracks of the concavoconvex pattern when the shaping sheet is peeled to enable reproduction of desired designed patterns faithfully and repeated use of the shaping sheet (cf., Patent Document 1, claims).

However, the above-mentioned shaping sheet has a limitation in the expression of the concavoconvex pattern when the concave portions are fine since when the shaping sheet is fabricated, the fabrication method includes a step of peeling the sheet from a rolled engraved plate.

Further, the above-mentioned method has the problem in that it cannot provide a clear concavoconvex pattern when concave portions are fine. On the other hand, when the concave portions are more or less wide, convex portions higher than the raised portions occur although the method can provide a concavoconvex design on the surface of the base material, and the method fails to provide a realistic feeling in the case of, for example, wood grain patters and unsatisfactory appearance and touch.

Further, a shaping sheet has been proposed which has formed on the surface thereof a concavoconvex layer made of a resin composition composed of an inorganic filler and a binder resin, in which only the resin composition for forming a fine concavoconvex layer that is applied onto a picture pattern formed by a repellent resin is rejected to form the concavoconvex layer (cf., Patent Document 2, claims).

However, since the concavoconvex layer is formed by rejecting the resin composition for forming the concavoconvex layer, the above-mentioned shaping sheet has poor stability of picture by a concavoconvex pattern and it takes an extremely long period of time for producing a shaping sheet because aging for a certain period of time for curing the concavoconvex layer is required. Therefore, the above-mentioned shaping sheet can not quickly respond to consumers' diversified needs.

Further, when used repeatedly, shaping sheets with a polyester film as a base material suffer from separation of impurities out of the base material to contaminate the surface of the shaping sheet, and because of the contamination, it often became difficult to shape a fine concavoconvex pattern with sharpness.

The decorative boards fabricated using the above-mentioned shaping sheets are widely used generally for resin decorative boards obtained by shaping synthetic resin materials, for example, polyester decorative boards.

Such a resin decorative board is known to be produced by a method of producing a decorative board having a concavoconvex surface that includes coating a substrate with a resin composition containing an unsaturated polyester resin or the like, superimposing a shaping sheet having a concavoconvex pattern on the resin, curing the resin composition, and peeling the shaping sheet having the concavoconvex pattern. As the shaping sheet used for producing a resin decorative board having a concavoconvex surface by such a method, a shaping sheet is proposed which has a wood grain concavoconvex picture on a surface thereof and a cured silicone resin over the whole surface thereof (cf., for example, Patent Document 3).

However, since the concavoconvex pattern imparted to the decorative board are not sufficiently fine and the strength of the surface is insufficient, it is difficult to repeatedly use the shaping sheet.

Further, as polyester decorative boards with highly elaborated design, those having well matched wood grain color patterns and a concavoconvex pattern have been proposed (cf., for example, Patent Document 4).

However, such polyester decorative boards have the problems in that the size of the picture varies as a result of contraction of the sheet since resins that cure at room temperature are used, so correction of the original printing plate is necessary.

Further, a pigment that imparts design properties, such as a pearl pigment, a silver pigment, and a titanium pigment is added to an article to be shaped, to thereby impart decorativeness to the decorative board. In this case, the design property-imparting pigment contained in the article to be shaped may be separated in the process of producing decorative boards, resulting in failure in decorativeness of the decorative board.

Further, the separated design property-imparting pigment may remain on the surface of a mirror-finished metal plate or a shaping sheet, so the repeated shapability may be prevented.

[Patent Document 1]: JP 7-164519 A
[Patent Document 2]: JP 5-92484 A
[Patent Document 3]: JP 7-144398 A
[Patent Document 4]: JP 8-267687 A

DISCLOSURE OF THE INVENTION

Under the circumstances, it is an object of the present invention to provide: a shaping sheet that has a fine concavoconvex pattern, allows elaborated shaping with a high-grade feeling, and has excellent releasability; a shaping sheet having excellent design properties and releasability that can readily control a lustrous part and a matted part; and further a shaping sheet whose surface is free of contamination by impurities separated out of the base material even when the shaping sheet is repeatedly used.

Further, it is another object of the present invention to provide: a resin decorative board that has a fine concavoconvex pattern and gives a high-grade feeling; and a method of producing a decorative board which is free of separation of the design property-imparting pigment such as a pearl pigment contained in the article to be shaped, of failure in decorativeness of the decorative board, and of contamination of a surface of a mirror-finished metal plate or a shaping sheet by the design property-imparting pigment separated from the article to be shaped even when the decorative board is repeatedly used.

The inventors of the present invention have made extensive studies with a view to achieving the above-mentioned objects and they have found that the objects can be achieved by the following constitutions. That is, the above-mentioned objects can be achieved by the following.

(1) A shaping sheet including a base material having thereon an ink layer and a surface shaping layer, the surface shaping layer being configured to have a concavoconvex pattern on the surface thereof.

(2) A shaping sheet including a base material having thereon a transparent or translucent matted primer layer containing a releasing agent and a surface shaping layer, in which the surface shaping layer is a crosslinked and cured product of a curable resin composition that contains a releasing agent and a matting agent.

(3) A shaping sheet including a base material made of a polyester film having thereon an ink layer and a surface shaping layer, in which the base material is a base material that shows a decrease in weight (hereinafter, sometimes referred to simply as "weight decrease") of 1.0 mass % or less when the base material is immersed in xylene.

(4) Use of a specified shaping sheet in the production of a resin decorative board.

(5) Incorporation of a reactive silicone into the surface shaping layer in a method of producing a resin decorative board. The present invention thus has been completed based on such a finding.

That is, the present invention is to provide:

(1) a shaping sheet, including a base material having at least an ink layer provided on the whole surface thereof and a surface shaping layer that is present on the ink layer, contacts the ink layer, and covers the whole surface of the ink layer, in which the surface shaping layer is a crosslinked and cured product of a curable resin composition and the surface shaping layer has a concavoconvex pattern on a surface thereof;

(2) a shaping sheet, including a base material having thereon at least a transparent or translucent matted primer layer that is provided on the whole surface thereof and contains a releasing agent and a surface shaping layer partly provided on the primer layer, in which the surface shaping layer is a crosslinked and cured product of a curable resin composition that contains a releasing agent and a matting agent;

(3) a shaping sheet, including a base material made of a polyester film having thereon an ink layer provided at least partly and a surface shaping layer that is present above the ink layer, contacts the ink layer, and covers the whole surface over a region in which the ink layer is formed and a region in which the ink layer is not formed, in which the surface shaping layer is a crosslinked and cured product of an ionizing radiation-curable resin composition and the base material shows a weight decrease of 1.0 mass % or less when immersed in xylene at 140° C. for 24 hours;

(4) a resin decorative board, that is formed by laminating an adhesive layer and a decorative sheet layer on a base material on the upper surface thereof in this order, applying a resin composition on the decorative sheet layer, abutting a shaping sheet on the coated resin composition, curing the resin composition and the shaping sheet integrally, and peeling the shaping sheet to form a resin layer, in which the shaping sheet includes a base material having at least an ink layer provided on the whole surface thereof and a surface shaping layer that is present on the ink layer or partly provided on the surface thereof, contacts the ink layer, and covers over the whole surface of the ink layer, in which the surface shaping layer is a crosslinked and cured product of an ionizing radiation-curable resin composition; and (5) a method of producing a decorative board, including shaping an article to be shaped using a shaping sheet that has a base material and a surface shaping layer on the base material, in which the article to be shaped contains a design property-imparting pigment and the surface shaping layer is made of a crosslinked and cured product of an ionizing radiation-curable resin composition containing a reactive silicone.

According to the present invention, there can be obtained: a shaping sheet that has a fine concavoconvex pattern, enables elaborate shaping with a high-grade feeling, and has excellent releasability; a shaping sheet that can readily control a lustrous portion and a matted portion and has excellent design properties and releasability; and a shaping sheet whose surface is not contaminated by, for example, impurities that separate out of the base material or the like even when the shaping sheet is repeatedly used.

Further, according to the present invention, a resin decorative board that has a fine concavoconvex pattern and a high-grade feeling can be obtained.

Further, according to the present invention, there can be provided a method of producing a decorative board that has a fine concavoconvex pattern, enables to have elaborate shaping with a high-grade feeling, has excellent releasability, and is free of separation of the design property-imparting pigment such as a pearl pigment contained in the article to be shaped, of failure in decorativeness of the decorative board, and of contamination of a surface of a mirror-finished metal plate or a shaping sheet by the design property-imparting pigment separated from the article to be shaped even when the decorative board is repeatedly used.

BRIEF DESCRIPTION OF THE DRAWINGS

FIG. 1 is a schematic diagram showing a cross-section of the shaping sheet of the present invention.

FIG. 2 is a schematic diagram showing a cross-section of the shaping sheet of the present invention.

FIG. 3 is a schematic diagram showing a cross-section of the shaping sheet of the present invention.

FIG. 4 is a schematic diagram showing a cross-section of the shaping sheet of the present invention.

FIG. 5 is a schematic diagram showing a cross-section of the shaping sheet of the present invention.

FIG. 6 is a schematic diagram showing a cross-section of the shaping sheet of the present invention.

FIG. 7 is a schematic diagram showing a cross-section of the shaping sheet of the present invention.

FIG. 8 is a schematic diagram showing a cross-section of the shaping sheet of the present invention.

FIG. 9 is a schematic diagram showing a cross-section of the shaping sheet of the present invention.

FIG. 10 is a schematic diagram showing a cross-section of the shaping sheet of the present invention.

FIG. 11 is a schematic diagram showing a cross-section of the resin decorative board of the present invention.

FIG. 12 is a schematic diagram showing a cross-section of a shaping sheet used in the present invention.

FIG. 13 is a schematic diagram showing a cross-section of a shaping sheet used in the present invention.

FIG. 14 is a schematic diagram showing a cross-section of a shaping sheet used in the present invention.

FIG. 15 is a schematic diagram showing a cross-section of a shaping sheet used in the present invention.

FIG. 16 is a schematic diagram illustrating a process of peeling the shaping sheet of the present invention.

FIG. 17 is a schematic diagram showing a cross-section of a construction material.

FIG. 18 is a schematic diagram showing a cross-section of the shaping sheet of Example 3.

FIG. 19 is a schematic diagram showing a process of producing a melamine resin board.

DESCRIPTION OF REFERENCE NUMERALS

1 DECORATIVE SHEET
2 BASE MATERIAL
3 INK LAYER
3-a INK
3-b INK
3-c INK
4 INTERACTION REGION
4-a INTERACTION REGION
4-b INTERACTION REGION
4-c INTERACTION REGION
5 SURFACE SHAPING LAYER
6 PENETRATION PREVENTING LAYER
7 RAISED PATTERN
7-a RAISED PATTERN
7-b RAISED PATTERN
7-c RAISED PATTERN
8 FINE PARTICLE OR CALCINED KAOLIN PARTICLE
8-a FINE PARTICLE OR CALCINED KAOLIN PARTICLE
8-b FINE PARTICLE OR CALCINED KAOLIN PARTICLE
9 ADHESIVE LAYER
10 SUBSTRATE
11 DECORATIVE BOARD (RESIN DECORATIVE BOARD)
12 FINE RAISED PATTERN
13 FINE CONCAVOCONVEX SURFACE
14 CONCAVE PATTERN
14-a CONCAVE PATTERN
14-b CONCAVE PATTERN
14-c CONCAVE PATTERN
15 MATTED PRIMER LAYER
16 CONVEX PATTERN
16-a CONVEX PATTERN
16-b CONVEX PATTERN
16-c CONVEX PATTERN
17 DECORATIVE SHEET LAYER
17-a SHEET LAYER
17-b SOLID PRINTING LAYER
17-c PICTURE LAYER
18 RESIN LAYER
19 PATTERN LAYER
20 COATING LAYER
21 INTERACTION PREVENTING LAYER
21a CUT OUT PORTION
22 MIRROR-SURFACE METAL PLATE
23 PRINTING SURFACE CONTAINING PEARL PIGMENT
24 PRINTING SHEET
25 OVERLAY PAPER
26 CORE PAPER

BEST MODE FOR CARRYING OUT THE INVENTION

The shaping sheet of the present invention is a shaping sheet characterized by including a base material having at least and ink layer provided on the whole surface thereof and a surface shaping layer that is present on the ink layer, contacts the ink layer, and covers the whole surface of the ink layer, in which the surface shaping layer is a crosslinked and cured product of a curable resin composition and the surface shaping layer has concavoconvex pattern on a surface thereof.

The structure of the shaping sheet of the present invention will be explained by referring to FIGS. 1 to 3. FIGS. 1 to 3 are schematic diagrams each showing a cross-section of a shaping sheet 1 of the present invention. The example shown in FIG. 1 includes a base material 2 having laminated thereon in order a uniform and homogeneous penetration preventing layer 6 covering the whole surface of the base material, an ink layer 3, and a surface shaping layer 5 made of a crosslinked and cured product of a curable resin composition, and the surface shaping layer 5 has a fine concavoconvex surface 13 on the surface thereof. The ink layer 3 is present on the whole surface and an interaction region 4 is formed in the surface shaping layer that is present on the ink layer 3. In the figures, the interaction region 4 is expressed by a set of points.

The upper part of the interaction region 4 on the outermost surface of the surface shaping layer 5 has the fine concavoconvex surface 13 as a result of the formation of the ink layer 3. By providing the surface of the surface shaping layer 5 with the fine concavoconvex surface, a shaping sheet having a fine concavoconvex pattern can be obtained.

Further, as shown in FIG. 3, varying the thickness of the ink layer 3 enables realization of a raised pattern 7 on the surface of the surface shaping layer 5 in accordance with the thickness of the ink layer 3, thereby imparting a concavoconvex pattern thereto.

As shown in FIGS. 1 to 3, the extension of the interaction region 4 that is formed in the surface shaping layer 5 is not particularly limited as far as the effects of the present invention are exhibited. The interaction region 4 may extend from the surface of the ink layer 3 and remain halfway in the direction of thickness of the surface shaping layer 5 or may reach the outermost surface of the surface shaping layer 5.

Further, a fine raised pattern 12 caused by fine particles or calcined kaolin particles partly imparts fine raised patterns to the raised pattern 7 and the fine concavoconvex surface 13 which are expressed over the whole surface of the surface shaping layer 5, respectively.

By the effect of the fine concavoconvex surface formed by the interaction region 4 in the surface shaping layer 5, the effect of protrusion of the fine particles on the surface of the surface shaping layer 5, and the effect of the raised pattern formed in accordance with the thickness of the ink layer 3, a shaping sheet that has a fine concavoconvex pattern and enables elaborate shaping giving a high-grade feeling can be obtained.

The shaping sheets of the present invention include one that is characterized by including a base material having thereon at least a transparent or translucent matted primer layer that contains a releasing agent and is applied over the whole surface of the base material and a surface shaping layer partly applied on the matted primer layer, in which the surface shaping layer is a crosslinked and cured product of a curable resin composition that contains a releasing agent and a matting agent.

The structure of the shaping sheet according to the above-mentioned embodiment of the present invention will be explained by referring to FIG. 4.

FIG. 4 is a schematic diagram showing a cross-section of the shaping sheet 1 of the present invention. The example shown in FIG. 4 includes a base material 2 having laminated thereon in order a uniform and homogeneous penetration preventing layer 6 extending over the whole surface of the base material, a matted primer layer 15, and a surface shaping layer 5 made of a crosslinked and cured product of a curable resin composition. The surface shaping layer 5 is provided partly and forms a shaping sheet having a fine concavoconvex pattern as a whole.

Then, the present invention includes a shaping sheet that is characterized by including a base material made of a polyester film, having thereon an ink layer provided at least partly and a surface shaping layer that is present above the ink layer, contacts the ink layer, and covers the whole surface including a region in which the ink layer is formed and a region in which the ink layer is not formed, in which the surface shaping layer is a crosslinked and cured product of an ionization radiation-curable resin composition and the base material shows a weight decrease of 1.0 mass % or less when immersed in xylene at 140° C. for 24 hours.

In this shaping sheet, the ink layer is provided partly and the surface of the surface shaping layer that is positioned just above the ink layer and above a portion near the ink layer has a convex pattern.

The structure of the shaping sheet according to the above-mentioned embodiment of the present invention will be explained by referring to FIGS. 5 and 6. FIGS. 5 and 6 are schematic diagrams each showing a cross-section of the shaping sheet 1 of the present invention.

The example shown in FIG. 5 includes a base material 2 that has laminated thereon in order a uniform and homogeneous penetration preventing layer 6 covering the whole surface of the base material, and an ink layer 3, a surface shaping layer 5 made of a crosslinked and cured product of an ionization radiation-curable resin composition. The ink layer 3 is present partly and an interaction region 4 is formed in the surface shaping layer just above the base material and above a portion near the base portion. The interaction region 4 is expressed by a set of dots.

The upper part of the interaction region 4 on the outermost surface of the surface shaping layer 5 is raised according as the ink layer 3 is formed and is in the form of a convex pattern 16 (the same meaning as the above-mentioned raised pattern 7). Such a convex pattern on the surface of the surface shaping layer 5 allows a shaping sheet having a concavoconvex pattern as a whole to be formed. Note that the height of the convex pattern is not particularly limited as far as the effect of the present invention is exhibited and it is usually within the range of 1 to 3 μm.

On the other hand, when the ink layer 3 is applied all over the surface of the base material, the convex pattern 16 will not appear as shown in FIG. 1. However, since there are fine concaves and convexes (fine concavoconvex surface 13) that are finer than the convex pattern 16 on the outermost surface of the surface shaping layer 5, use of such a shaping sheet enables shaping of a matte design on the surface of a decorative board to be shaped.

The extension of the interaction region 4 formed in the surface shaping layer 5 is the same as mentioned above. That is, the extension of the interaction region 4 is not particularly limited as far as the effect of the present invention is exhibited. The interaction region 4 may extend from the surface of the ink layer 3 and remain halfway in the direction of the thickness of the surface shaping layer 5 as shown in FIG. 5, or it may reach the outermost surface layer 5 as shown in FIG. 6.

Now, constitutions of the base material and various layers that constitute the shaping sheet of the present invention will be explained in detail.

Base Material 2

The base material 2 used in the present invention is not particularly limited as far as it is used as a base material for ordinary shaping sheets and may be selected depending on the purpose or the like as appropriate from, for example, various papers, plastic films, plastic sheets, metal foils, metal sheets, metal plates, and ceramic materials. Any one of these materials may be used alone or they may be used as laminates of any combinations thereof, for example, a composite of paper, a composite of paper and a plastic film, and so on.

When these base materials, in particular, when plastic films and plastic sheets are used as the base materials, one or both sides thereof are subjected to a physical or chemical surface treatment such as an oxidation method or unleveling method as desired in order to increase adhesion to an overlying layer.

Examples of the above-mentioned oxidation method include a corona discharge treatment, a chromic acid treatment, a flame treatment, a hot-air treatment, an ozone/UV treatment, and so on. Examples of the unleveling method include a sandblast method, a solvent treatment, and so on. These surface treatments may be selected as appropriate depending on the kind of the base material. In general, the corona discharge treatment is desirably used in view of the effect and handleability.

Further, the base material may be subjected to a treatment such as formation of a primer layer in order to strengthen interlayer adhesion or the like between the base material and each layer. Further, coating for adjusting color and a pattern from the viewpoint of design may be formed in advance.

The various kinds of paper that can be used as the base material include tissue paper, craft paper, and titanium paper. These paper base materials may further be added (impregnation after paper making or filling in after paper making) with, in addition to a paper material, resins such as an acrylic resin, styrene-butadiene rubber, a melamine resin, and a urethane resin in order to increase interfilament strength in the paper base material or interlayer strength between the paper base material and another layer, or to prevent scuffing. It may be, for example, interpaper strengthened paper, resin-impregnated paper, or the like.

Besides these, examples of the paper base material include various kinds of paper that are used in the field of construction materials such as linter paper, a card board, base paper for a gypsum board, vinyl wallpaper having provided a vinyl chloride resin layer on a surface thereof. Further, coated paper, art paper, sulfate paper, glassine paper, parchment paper, paraffin paper, or Japanese paper which is used in a field of official work and for typical printing, wrapping, or the like can be used. In distinction to the paper, woven or nonwoven fabrics of various fibers having appearance and properties similar to those of paper may also be used as the base material. Various fibers include inorganic fibers such as a glass fiber, an asbestos fiber, a potassium titanate fiber, an alumina fiber, a silica fiber, and a carbon fiber, and synthetic resin fibers such as a polyester fiber, an acrylic fiber, and a vinylon fiber.

As a plastic film or a plastic sheet, there may be given a plastic film or a plastic sheet composed of any of various synthetic resins. Examples of the synthetic resins include: a polyolefin resin such as a polyethylene resin, a polypropylene resin, a polymethylpentene resin, or an olefin-based thermoplastic elastomer; a vinyl-based resin such as a polyvinyl chloride resin, a polyvinylidene chloride resin, a polyvinyl alcohol resin, a vinyl chloride-vinyl acetate copolymer resin, an ethylene-vinyl acetate copolymer resin, or an ethylene-vinyl alcohol copolymer resin; a polyester resin such as a polyethylene terephthalate resin, a polybutylene terephthalate resin, a polyethylene naphthalate-isophthalate copolymer resin, or a polyester-based thermoplastic elastomer; an acrylic resin such as a polymethyl (meth)acrylate resin, a polyethyl(meth)acrylate resin, or a polybutyl(meth)acrylate resin; a polyamide resin typified by nylon 6 or nylon 66; a cellulose-based resin such as a cellulose triacetate resin or a cellophane; a polystyrene resin; a polycarbonate resin; a polyallylate resin; and a polyimide resin.

Examples of the metal foil, metal sheet, and metal plate that can be used include those made of aluminum, iron, stainless steel, or copper. Further, those obtained by, for example, plating with these metals may also be used. Examples of the ceramic materials include ceramic construction materials such as a gypsum board, a calcium silicate plate, and a wood chip cement board, ceramics, glass, enamel, and baked tiles. Beside these, composite materials of various materials, such as a fiber reinforced plastic (FRP) board, a board including a paper honeycomb having applied on each side thereof an iron plate, a board including two aluminum plates and a polyethylene resin sandwiched therebetween may be used as the base material.

Among these, the base material 2 is preferably a material that has excellent heat resistance and dimension stability, and a polyester film is particularly preferable.

Examples of the polyester film include films of resins such as polyethylene terephthalate (hereinafter, expressed as "PET"), polybutylene terephthalate, polyethylene-2,6-naphthalate, and poly-1,4-cyclohexanedimethylene terephthalate. Among these, polyethylene terephthalate is particularly preferable since it is not expensive. Further these resins may be either homopolymers or copolymers. Further, these resins may be mixed.

In particular, among the shaping sheets of the present invention, a shaping sheet that includes a base material made of a polyester film, an ink layer provided at least partly provided on the base material, and a surface shaping layer that is present above the ink layer, contacts the ink layer, and covers the whole surface including a region in which the ink layer is formed and a region in which the ink layer is not formed has a weight decrease of preferably 1.0 mass % or less as measured by immersing the base material 2 made of the polyester film in xylene at 140° C. for 24 hours and then drying. By using such a base material, separation of impurities out of the base material can be minimized even when the base material is repeatedly used, so the surface of the shaping sheet is not contaminated and the defect that no fine concavoconvex pattern can be formed due to the contamination is avoided.

In view of the above, the weight decrease of the base material 2 by immersion in the xylene is preferably 0.65 mass % or less. The lower limit of the weight decrease is not particularly limited and the weight loss as low as possible is preferable from a viewpoint of contamination on the surface of the shaping sheet. However, excessive suppression of the weight decrease means that an excessive treatment is performed in the technique of suppressing the weight decrease as described in detail herein below and may result in a decrease in other physical properties of the base material. From this viewpoint, the weight decrease is particularly preferably within the range of 0.30 to 0.65 mass %.

Note that the impurities referred to herein is believed to be derived from an oligomer component such as an ethylene terephthalate cyclic trimer when, for example, PET is used.

Examples of the method for minimizing the weight decrease by the above-mentioned immersion in xylene include surface treatments such as a washing treatment, a corona discharge treatment, a plasma treatment, and a flame treatment.

The washing treatment is usually performed by passing a polyester film through a washing tank filled with a solvent. Preferable examples of the solvent to be used include water and alcohols. Ethanol is particularly preferable. Further, it is preferable to continuously apply ultrasonic vibration to the polyester film during the washing treatment. Ultrasonic vibration can more completely wash away the oligomer on the surface of the polyester. After the washing treatment, it is preferable to further wash the re-attached oligomer with a washing solution (i.e., solvent) like a shower and then dry the washed film.

The corona discharge treatment is a treatment by which a member to be treated is inserted between a pair of electrodes under atmospheric pressure and a high voltage alternate current is applied between the both electrodes to excite corona discharge to subject the surface of the member to be treated by corona discharge. Examples of the gas that generates corona include helium, argon, nitrogen, carbon monoxide, carbon dioxide, and oxygen. Also, a gas mixture thereof may be used.

The corona discharge treatment also has the effect of increasing interlayer adhesion between the base material 2 and an overlying layer as mentioned above. Therefore, the conditions of the corona discharge treatment must be determined taking into consideration suppression of the interlayer adhesion as well as suppression of vaporization of impurities in the base material. Specifically, it is preferable to control surface tension and interlayer adhesion by controlling discharge time.

Further, in the plasma treatment, glow discharge can generate active species having higher activities than those generated by corona discharge under a low pressure of about 0.001 to about 0.01 Torr., so the surface treatment of the base material 2 can be performed efficiently. However, the plasma treatment is performed in a vacuum system since a continuous treatment is difficult to be performed, so productivity may be poor and a large appliance is required.

The corona discharge treatment and plasma treatment have advantages that they decompose and remove only those oligomers that are present on the surface of the polyester base material, no harmful substances remain, and the increase in temperature is very small.

Also, in the flame treatment, only the substance that is attached to the surface of the polyester film can be removed similarly to the above-mentioned surface treatments. As the method of flame treatment, a method of performing a surface treatment by using a clean burner is preferably used.

The thickness of the base material 2 is not particularly limited. However, when a sheet prepared from a plastic as a material is used, the thickness of the sheet is usually within the range of about 20 to about 150 μm, preferably 30 to 100 μm, and when a paper base material is used, a basis weight is usually within the range of about 20 to about 150 g/m$^2$, preferably 30 to 100 g/m$^2$.

Penetration Preventing Layer 6

The penetration preventing layer 6 is a layer that is provided as desired and has a function to prevent the ink that constitutes the ink layer 3 described hereinafter, the resin that constitutes the matted primer layer 15, and the curable resin that constitutes the surface shaping layer 5 from permeating into the base material 2. The penetration preventing layer 6 is particularly effective when the base material 2 is a permeable base material such as paper and nonwoven fabric. Therefore, the penetration preventing layer 6 may be positioned between the base material 2 and the ink layer 3 or the matted primer layer 15. In general, a uniform and homogenous layer of a crosslinked and cured product of a curable resin that has adhesion with the curable resin that constitutes the surface shaping layer 5 is provided between the base material 2 and the ink layer 3 as shown in FIG. 1 or between the base material 2 and the matted primer layer 15 as shown in FIG. 4. This also serves to increase adhesion between the base material 2 and the ink layer 3, the matted primer layer 15, and the surface shaping layer 5. Note that the penetration preventing layer 5 is preferably provided in the case of a paper base material to stabilize the reproduction of luster of the matted primer layer.

Ink Layer 3

The ink layer 3 in the shaping sheet of the present invention is laminated on the penetration preventing layer 6 or the like optionally provided as shown in FIG. 1. When the ink layer 3 is provided over the whole surface of the penetration preventing layer 6, the ink layer 3 causes a fine concavoconvex pattern to be generated on the surface of the surface shaping layer 5.

Although the mechanism in which the fine concavoconvex surface 13 is generated on the surface of the surface shaping layer 5 is not fully elucidated, results of various experiments, observation, and measurement suggest that upon coating of an uncured preparation of a curable resin for forming the surface shaping layer 5 on the surface of the ink layer 3, the resin component of the ink layer 3 and the surface shaping layer undergo interactions such as partial elution, dispersion, and mixing by suitable selection of combinations of materials and coating conditions. On this occasion, it is thought that the respective resin components in the ink in the ink layer 3 and the uncured preparation of the curable resin are not in a completely compatible state but in a suspension state in a short period of time and are present just above the ink layer 3 and above a portion near the ink layer 3, so the portion in a suspension state forms an interaction region to exhibit a fine concavoconvex surface. It is presumed that by crosslinking and curing the surface shaping layer as it remains in a suspension state, such a state is fixed and the interaction region 4 is formed over the whole surface in the surface shaping layer as shown in FIGS. 1 to 3 to make the fine concavoconvex surface 13.

The ink that constitutes the ink layer 3 has properties that enable to exhibit interactions such as elution, dispersion, and mixing with the curable resin composition that constitutes the surface shaping layer 5 and is selected as appropriate in relation to the curable resin composition (i.e., uncured preparation), Specifically, it is preferable that the ink contain non-crosslinking resin as a binder resin. For example, a thermoplastic (non-crosslinking) urethane resin is preferable. Here, with a view to increasing the interaction with the curable resin composition that forms the surface shaping layer 5 and obtaining a further improved concavoconvex feeling of the pattern, it is more preferable that the content of the urethane resin be 50 mass % or more.

As the above-mentioned urethane resin, it is preferable to select a thermoplastic resin of a non-crosslinking urethane resin having a linear molecular structure instead of a urethane resin having a web-like steric molecular structure with three-dimensional crosslinking. Examples of such the non-crosslinking urethane resin include urethane resins each made from reaction between a polyol such as acryl polyol, polyester polyol, or polyether polyol as a polyol component, and an isocyanate including an aromatic isocyanate such as tolylene diisocyanate, xylene diisocyanate, or diphenylmethane diisocyanate, or an aliphatic isocyanate or an alicyclic isocyanate such as isophorone diisocyanate, hexamethylene diisocyanate, or hydrogenated tolylene diisocyanate as an isocyanate component. Generally, the number of the hydroxyl group per molecule of polyol and the number of the isocyanate group per molecule of isocyanate are average numbers of 2, respectively. A urethane resin having an average molecular weight of about 1,000 to 50,000 and a glass transition temperature (Tg) of about −70 to −40° C. is preferable for exhibition of the interaction region.

In addition, if required, a saturated or unsaturated polyester resin, an acrylic resin, a vinyl chloride-vinyl acetate copolymer, and the like may be mixed for adjusting the degree of the exhibition of the interaction region. Of those, a polyester resin is preferable, and an unsaturated polyester resin is particularly preferable. An addition amount of the unsaturated polyester resin is preferably in a range of 10 to 50 mass % with respect to a total binder amount of ink. Within the range, a sufficient enhancing effect on the exhibition of the interaction region is obtained. Examples of the unsaturated polyester resin are not particularly limited as far as it is a reaction product between unsaturated dicarboxylic acid and glycol. Examples of the unsaturated dicarboxylic acid include maleic acid, fumaric acid, and itaconic acid. Examples of the glycol include ethylene glycol, diethylene glycol, propylene glycol, and butylene glycol.

It is preferable that the ink composition for forming the ink layer 3 contain an extender pigment. The incorporation of the extender pigment allows the ink composition to be imparted with thixotropy, so the shape of the ink composition is maintained when the ink layer 3 is printed using a printing plate. This enables one to lay an emphasis on sharpness of the concavoconvex pattern at the end where a convex portion transitions into a concave portion, so well-modified expression of a design becomes possible.

The extender pigment used in the present invention is not particularly limited and selected from, for example, silica, talc, clay, barium sulfate, barium carbonate, calcium sulfate, calcium carbonate, magnesium carbonate, and the like as appropriate. Among these, silica which is a material which has high degree of freedom in designing a material such as degree of oil absorption, particle size, and pore volume, and is excellent in design property, whiteness, and coating stability as ink is preferable, and fine powder silica is particularly preferable. The particle size of silica is preferably within the range of 0.1 to 5 μm. If the particle size of silica is 0.1 μm or more, the thixotropy of an ink will not increase extremely when the silica is added to the ink while the viscosity of the ink will not increase too much, so printing can readily be controlled. In other words, the concavoconvex pattern can readily be controlled. On the other hand, if the particle size of silica is 5 μm or less, the head poke of the particles is relatively suppressed and is not conspicuous, so the state of developing interaction region becomes natural and a sense of strangeness for the concavoconvex pattern does not occur, resulting in a natural finish.

The content of the extender pigment in the ink composition is preferably within the range of 5 to 15 mass %. If the content of the extender pigment is 5 mass % or more, the ink composition can be imparted with sufficient thixotropy while the content of the extender pigment of 15 mass % or less is preferable since no decrease in the effect of imparting exhibition of a raised pattern and a fine concavoconvex surface is observed.

The coating amount of ink that forms the ink layer 3 is within the range of preferably 1 to 50 g/m². If the coating amount of the ink is 1 g/m² or more, the interaction between the ink and the curable resin composition occurs to provide a sufficient interaction region, so sufficient concavoconvex pattern can be obtained on the surface of the shaping sheet. On the other hand, if the coating amount of the ink is 50 g/m² or less, no mechanical restriction is posed when the ink is used in printing resulting in an economical advantage. From the above-mentioned viewpoints, the coating amount of the ink is more preferably within the range of 1 to 30 g/m², particularly preferably 1 to 10 g/m², and most preferably 1 to 7 g/m².

Further, by varying the coating amount of the ink composition, the thickness of the ink that constitutes the ink layer 3 can be made nonuniform. The degree of a difference in height of the raised portion exhibited by the nonuniform thickness varies stepwise or continuously, resulting in that the pattern of the shaping sheet is made into a gradation pattern in which the concavoconvex pattern is changed stepwise or a continuous pattern in which the concavoconvex pattern is changed continuously.

This is due to a relative increase in the interaction between the ink layer 3 and the surface shaping layer 5 according as the coating amount of the ink layer 3 increases relatively, so that the degree of a suspension state increases to make the relief of the raised pattern greater.

Hereinafter, detailed explanation will be made by referring to FIG. 3. In FIG. 3, inks 3-*a*, 3-*b*, and 3-*c* that constitute the ink layer 3 are made different in thickness from each other. That is, the film thickness becomes thinner stepwise in the order of 3-*a*, 3-*b*, and 3-*c*. With this constitution, the interaction regions 4-*a*, 4-*b*, and 4-*c* can be varied stepwise, and the raised patterns 7-*c*, 7-*b*, and 7-*a* of the obtained concavoconvex pattern are raised stepwise in this order. This is believed due to nonuniform thickness of the inks that constitute the ink layer 3 and the ink is applied so that the thickness of ink decreases in the order of 3-*a*, 3-*b*, and 3-*c*, and as a result, the portion having a larger thickness of ink has a greater relief of the raised pattern and the relief of the raised pattern decreases gradually in the order of 3-*a*, 3-*b*, and 3-*c*. By varying the thickness of the ink in a finer manner, the concavoconvex pattern can be continuously varied.

With the shaping sheet having such a structure, it is possible to impart a greater diversity of fine textures. Usually, the method of varying the thickness of the inks that constitute the ink layer 3 can be readily performed by varying the coating amount of the ink. It is also possible to continuously vary the gradation without steps instead of the above-mentioned stepwise variation by continuously varying the coating amount of the ink.

Next, in the case where the ink layer 3 in the shaping sheet of the present invention is partly provided on the penetration preventing layer 6 or the like that is provided as necessary as shown in FIG. 5, a convex pattern 16 is formed on the surface of the surface shaping layer 5.

Although the mechanism in which the convex pattern 16 of the present invention is generated is not fully elucidated as mentioned above, it is presumed that respective resin components in the ink in the ink layer 3 provided partly and the uncured preparation of the ionization radiation-curable resin composition provide a suspension state, and the portion in such a suspension state forms an interaction region to develop the convex pattern 16. It is presumed that, by crosslinking and curing the surface shaping layer as it remains in a suspension state, such a state is fixed and the interaction region 4 is formed partly in the surface shaping layer as shown in FIGS. 5 and 6 to make the fine convex pattern 16.

Hereinafter, detailed explanation will be made by referring to FIG. 7. In FIG. 7, inks 3-*a*, 3-*b*, and 3-*c* that constitute the ink layer 3 are made different in thickness from each other in the same manner as shown in FIG. 3. However, in FIG. 7, since the ink layer is partly provided, the convex portion 16 is formed and the height of the convex portion is decreased in the order of 16-*a*, 16-*b*, and 16-*c*. By varying the thickness of the ink in a finer manner, the concavoconvex pattern can be continuously varied. With the shaping sheet having such a structure, it is possible to impart a greater diversity of fine textures.

Usually, the method of varying the thickness of the inks that constitute the ink layer 3 can be readily performed by varying the coating amount of the ink as described above.

Next, in the example shown in FIG. 8, the ink layer 3 is laminated on the base material 2 such that the thickness is continuously varied in a plane parallel to the surface of the base material (such that the central portion is thick and becomes thinner towards the side portion), and surface shaping layer 5 made of crosslinked and cured product of the ionization radiation-curable resin composition is laminated thereon. In the same manner as shown in FIG. 7, the surface shaping layer on a portion just above the ink layer and in the vicinity thereof forms an interaction region. In the example shown in FIG. 8, the thickness of the ink layer increased in the order of 3-*c*, 3-*b*, and 3-*a*, in accordance of which, the relief of the convex pattern of the interaction regions 4-*c*, 4-*b*, and 4-*a* continuously increases in this order. As a result, the relief of the convex pattern in the surface shaping layer 5 continuously increases in this order.

The degree of extension of the interaction region 4 formed in the surface shaping layer 5 is not particularly limited as far as the effect of the present invention is exhibited and the interaction region 4 may extend from the surface of the ink layer 3 and remain halfway in the direction of the thickness of the surface shaping layer 5 as shown in FIG. 7, may reach the outermost surface of the surface shaping layer 5, or may form a convex pattern on the outermost surface of the surface shaping layer 5 as shown in FIGS. 8 and 9.

Surface Shaping Layer 5: Curable Resin Composition

Next, the surface shaping layer 5 is constituted by a crosslinked and cured product of the curable resin composition as mentioned above. The curable resin composition is not particularly limited and examples thereof include thermosetting resin compositions and ionization radiation-curable resin compositions based on melamine, urea, epoxy, ketone, diallyl phthalate, unsaturated polyester, phenol resins, or the like. Among these, the ionization radiation-curable resin compositions are preferable.

Here, the ionization radiation-curable resin compositions refer to those resin compositions that are crosslinked and cured by irradiation of those radiations having energy quantum capable of crosslinking and polymerizing molecules from among electromagnetic or charged particle radiations, that is, ultraviolet rays or electron beams. Specifically, appropriate monomers selected from among polymerizable monomers and polymerizable oligomers or prepolymers that are conventionally used as ionization radiation-curable resin compositions may be used.

To form a surface shaping layer by printing, printability is necessary. For forming a pattern, it is necessary to set the printability such that a transferred pattern should not become vapid when a pattern is transferred from a gravure plate to a shaping sheet. Therefore, it is necessary to mainly use a resin having a high viscosity at room temperature. Specifically, it is preferable that a polymerizable oligomer or a prepolymer be used as a main resin, and an extender pigment be added to increase the thixotropy of the ink. Further, solvent dilution is performed to decrease the viscosity of the ink to a degree that allows printing, a pattern is formed by printing, and then the solvent is dried by heating, followed by crosslinking and curing by a heating method, a method of applying an ionization radiation, or the like. Further, to increase the heat resistance and crosslink density, a polyfunctional polymerizable monomer may be added to the resin composition.

Typically, (meth)acrylate monomers having a radical polymerizable unsaturated group in the molecule are suitable as the polymerizable monomers. By inclusion of the (meth)acrylate monomer in the molecule, the above-mentioned interaction with the ink is obtained so that a difference in the relief of the raised pattern and fine concavoconvex surface are suitably formed. From the viewpoint of increasing the interaction with the ink and obtaining a further difference in the relief of the raised pattern and a fine concavoconvex surface, it is preferable that the content of the (meth)acrylate monomer be 50 mass % or more.

As a (meth)acrylate monomer, polyfunctional (meth)acrylate is preferable. Here, the term "(meth)acrylate" means "acrylate or methacrylate". Polyfunctional (meth)acrylate is not particularly limited as far as a (meth)acrylate has two or more ethylenically unsaturated bonds in its molecule. Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentyl glycol di(meth)acrylate, dicyclopentanyl di(meth)acrylate, caprolactone modified dicyclopentenyl di(meth)acrylate, ethyleneoxide modified phosphate di(meth)acrylate, allylated cylcohexyl di(meth)acrylate, isocyanurate di(meth)acrylate, trimethylolpropane tri(meth)acrylate, ethyleneoxide modified trimethylolpropane tri(meth)acrylate, dipentaerythritol tri(meth)acrylate, propionate modified dipentaerythritol tri(meth)acrylate, pentaerythritol tri(meth)acrylate, propyleneoxide modified trimethylolpropane tri (meth)acrylate, tris(acryloxyethyl) isocyanurate, propionate modified dipentaerythritol penta(meth)acrylate, dipentaerythritol hexa(meth)acrylate, ethyleneoxide modified dipentaerythritol hexa(meth)acrylarte, and caprolactone modified dipentaerythritol hexa(meth)acrylate. One of those polyfunctional (meth)acrylates may be used alone, or two or more of them may be used in combination.

In the present invention, a monofunctional (meth)acrylate can appropriately be used in combination with the above-mentioned polyfunctional (meth)acrylate for the purpose of, for example, reducing the viscosity of the polyfunctional (meth)acrylate to the extent that the object of the present invention is not impaired. Examples of the monofunctional (meth)acrylate include methyl(meth)acrylate, ethyl(meth)acrylate, propyl (meth)acrylate, butyl(meth)acrylate, pentyl (meth)acrylate, hexyl (meth)acrylate, cyclohexyl(meth)acrylate, 2-ethylhexyl (meth)acrylate, lauryl(meth)acrylate, stearyl(meth)acrylate, and isobornyl(meth)acrylate. One of those monofunctional (meth)acrylates may be used alone, or two or more of them may be used in combination.

Next, examples of the polymerizable oligomer include oligomers each having a radical polymerizable unsaturated group in its molecule such as an epoxy (meth)acrylate-based oligomer, a urethane (meth)acrylate-based oligomer, a polyester (meth)acrylate-based oligomer, and a polyether (meth)acrylate-based oligomer. Here, an epoxy (meth)acrylate-based oligomer can be obtained, for example, by reacting and esterifing an oxirane ring of a bisphenol-type epoxy resin with relatively lower-molecular weight or a novolac-type epoxy resin with (meth)acrylate. In addition, a carboxyl modified-type epoxy (meth)acrylate oligomer, in which the epoxy(meth) acrylate-based oligomer is partially modified with dibasic carboxylic anhydride, can also be used. A urethane (meth)acrylate-based oligomer can be obtained, for example, by subjecting a polyurethane oligomer obtained by a reaction between polyether polyol or polyester polyol and polyisocyanate to esterification with (meth)acrylate. Polyester (meth)acrylate-based oligomer can be obtained, for example, by subjecting a hydroxyl group of a polyester oligomer having hydroxyl groups at both terminals obtained by condensing polycarboxylic acid and polyalcohol to esterification with (meth)acrylate, or by subjecting a hydroxyl group at a terminal of an oligomer obtained by adding alkyleneoxide to polycarboxylic acid to esterification with (meth)acrylate. A polyether (meth)acrylate-based oligomer can be obtained by esterifing a hydroxyl group of polyether polyol with (meth)acrylate.

Further, examples of the polymerizable oligomers include, in addition to the above-mentioned polymerizable oligomers, highly hydrophobic polybutadiene (meth)acrylate-based oligomers having a (meth)acrylate group in the side chain of a polybutadiene oligomer, silicone (meth)acrylate-based oligomers having a polysiloxane bond in the main chain, aminoplast resin (meth)acrylate-based oligomers obtained by modifying an aminoplast resin having many reactive groups in a small molecule, and oligomers each having a cationic polymerizable functional group in a molecule, such as novolak-type epoxy resins, bisphenol-type epoxy resins, aliphatic vinyl ether resins, and aromatic vinyl ether resins.

In the present invention, the interaction between the inks that constitute the ink layer 3 and the curable resin composition that constitutes the surface shaping layer 5 is important as described above and from this viewpoint, a suitable ink and a suitable curable resin composition are selected. Among the ionization radiation-curable resin compositions, those containing a polyfunctional (meth)acrylate monomer are preferable.

In a case of using an ultraviolet curable resin composition as an ionization radiation-curable resin composition, it is preferable that a photopolymerization initiator be added in an amount of about 0.1 to 5 parts by mass with respect to 100 parts by mass of the resin composition. A photopolymerization initiator can appropriately be selected from photopolymerization initiators which have been conventionally used, and is not particularly limited. Examples of the photopolymerization initiator for a polymerizable monomer or a polymerizable oligomer having a radical polymerizable unsaturated group in a molecule include benzoin, benzoin methyl ether, benzoin ethyl ether, benzoin isopropyl ether, benzoin-n-butyl ether, benzoin isobutyl ether, acetophenone, dimethylamino acetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexylphenylketone, 2-methyl-1-[4-(methylthio)phenyl]-2-morpholino-propan-1-one, 4-(2-hydroxyethoxy)phenyl-2(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tertiarybutylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, and acetophenone dimethylketal.

In addition, examples of the photopolymerization initiator for a polymerizable oligomer having a cationic polymerizable functional group in a molecule and the like include an aromatic sulfonium salt, an aromatic diazonium salt, an aromatic iodonium salt, a metallocene compound, and benzoin sulfonic ester.

Further, as a photosensitizer, for example p-dimethylbenzoic ester, tertiary amines, thiol-based sensitizers, and the like can be used.

In the present invention, it is preferable to use an electron beam-curable resin composition as the ionization radiation-curable resin composition. It is possible to formulate the ionization radiation-curable resin composition without solvents and such a solvent-less composition is more preferable from the viewpoint of environment and health, and since it requires no photopolymerization initiators and stable curing properties can be obtained.

Surface Shaping Layer 5: Fine Particles

Further, for the purpose of obtaining a fine raised pattern, it is preferable that the shaping sheet of the present invention contain fine particles in the curable resin composition that constitutes the surface shaping layer 5. As the fine particles, use is made of those having an average particle size that is a plus-side approximation of the maximum thickness of the surface shaping layer 5 positioned just above the ink layer 3. The shaping sheet of the present invention that is formulated with the fine particles will be explained in detail by referring to FIG. 2. The shaping sheet shown in FIG. 2 is one in which fine particles are formulated in the curable resin composition.

The fine particles 8 blended in the surface shaping layer each have an average particle size $d_A$ which is a plus-side approximation of a maximum thickness $t_M$ of the surface shaping layer 5 positioned just above the ink layer 3. In other words, $d_A$ is slightly greater than $t_M$, so that the fine particles 8 protrude from the surface of the surface shaping layer 5. The portion at which the protrusion occurred forms a raised pattern, so it can provide a fine concavoconvex feeling. Along with this, in the inside of the surface shaping layer 5, the interaction region 4 is formed that develops a raised pattern just above the ink layer 3 due to the interaction between the ink in the ink layer 3 and the curable resin composition that constitutes the surface shaping layer 5.

Therefore, the concavoconvex pattern developed on the surface of the surface shaping layer becomes fine and elaborated with a high-grade feeling by the interaction region 4 in the surface shaping layer 5, the effect of the protrusion of the fine particles from the surface of the surface shaping layer 5, the raised pattern formed along with the formation of the ink layer 3, and the effect of a fine concavoconvex pattern.

Note that the maximum thickness $t_M$ of the surface shaping layer 5 positioned just above the ink layer 3 corresponds to the thickness of the surface shaping layer 5 when the convex pattern along with the formation of the ink layer 3 is not formed and to the thickness of the surface shaping layer 5 including the convex pattern when the convex pattern is formed.

Further, in a mode in which the ink layer is partly provided as shown in FIG. 10, fine particles 8-*b* that are positioned at a portion not just above the ink layer 3 do not protrude and thus they do not contribute to development of the convex pattern.

The above-mentioned fine particles are preferable since its usage is more easily set when their particle size distribution is closer to monodispersion and the above-mentioned effect can be exhibited well in a small usage.

In the present invention, a coefficient of variation, CV [(standard deviation of particle size/average particle size)×100] of particle size distribution of the fine particles is preferably 30% or less. If the CV is 30% or less, the fine particles have a practically useful particle size distribution and the above-mentioned effect can be fully exhibited with a suitable usage. This CV is more preferably 20% or less and still more preferably 15% or less.

Further, assuming that the average particle size of the fine particles is $d_A$, and the maximum thickness of the surface shaping layer positioned just above the ink layer is $t_M$, it is preferable that the relationship as shown in equation (1):

$$1.05 \times t_M \leq d_A \leq 1.25 \times t_M \quad (1)$$

be satisfied. If the average particle size $d_A$ of the fine particles is within the above-mentioned range, the fine particles protrude from the surface of the surface shaping layer positioned just above the ink layer and the above-mentioned effect is fully exhibited even though the fine particles sink in the ink layer.

The shape of the fine particles is not particularly limited and spherical, ellipsoidal, or polyhedral particles or the like can be used. Spherical fine particles are preferable. Note that in the present invention, the particle size of fine particles each having the shape other than spherical one is indicated by a value of the diameter of a circumscribing sphere.

The content of the fine particles in the surface shaping layer depends on the average particle size of the fine particles, the coefficient of variation CV of the particle size distribution, and so on and usually is selected to be a value within the range of 2 to 20 mass %. If the content is 2 mass % or more, the effect of inclusion of the fine particles can be exhibited. If the content is 20 mass % or less, the concavoconvex feeling of the concavoconvex pattern formed on the surface of the shaping sheet is good. The content of the fine particles is preferably 4 to 16 mass % and more preferably 4 to 13 mass %.

The fine particles may be either inorganic fine particles or organic fine particles. Examples of the inorganic fine particles include particles of silica, alumina, aluminosilicate, kaolinite, calcium carbonate, barium sulfate, glass, and the like. Examples of the organic fine particles include particles of acrylic resins, polycarbonate resins, urethane resins, urea resins, benzoguanamine resins, benzoguanamine-melamine-formaldehyde condensates, and the like.

These fine particles may be used alone or two or more of them may be used in combination. In view of the effect of the present invention, silica particles are preferable.

Further, the fine particles may be used together with calcined kaolin particles having similar effects as described below.

Surface Shaping Layer 5: Calcined Kaolin Particles

Further, it is preferable that the surface shaping layer 5 contain calcined kaolin particles. With the calcined kaolin particles contained in the surface shaping layer, the concavoconvex pattern of the surface of the shaping sheet can be made finer and anti-marring property is increased. Here, marring means generation of tiny scratches when the surface of a sheet is rubbed, and excellent anti-marring property means that scratches are not likely to generate. By imparting such a capability to the shaping sheet, the surface shaping layer can be strengthened to give rise to a shaping sheet that can endure a longer period of use, and the production cost of a decorative board can be decreased.

Calcined kaolin particles that are used in order to impart a finer concavoconvex pattern and anti-marring property to the surface of the shaping sheet are kaolin particles obtained by baking typical (hydrated) kaolin particles. Addition of the calcined kaolin particles as a filler makes it possible to realize improvement of the anti-marring property that have not been realized with silica particles or unbaked hydrated kaolin particles. Note that the particle size of the calcined kaolin particles may be selected as appropriate depending on applications, physical properties required, and so on and is, for example, 0.5 to 2 µm. Note that the addition amount of the calcined kaolin particles may be selected as appropriate depending on applications, physical properties required, and so on and is, for example, about 5 to about 50 mass parts per 100 mass parts of a curable resin.

Note that the calcined kaolin particles are superior to hydrated kaolin particles in the coating stability.

A calcined kaolin particle which surface is further treated may be used. The anti-marring increasing effect can be additionally enhanced by using the calcined kaolin particle which surface is treated. An example of a surface treatment is a surface treatment with a silane coupling agent. Examples of the silane coupling agent include known silane coupling agents each having an alkoxy group, an amino group, a vinyl group, an epoxy group, a mercapto group, a chlor group, or the like. Specific examples of the silane coupling agent include γ-aminopropyltriethoxysilane, γ-methacryloxypropyltrimethoxysilane, γ-methacryloxypropylmethyldimethoxysilane, γ-methacryloxypropyldimethylmethoxysilane, γ-methacryloxypropyltriethoxysilane, γ-methacryloxypropyldimethylethoxysilane, γ-acryloxypropyltrimethoxysilane, γ-acryloxypropylmethyldimethoxysilane, γ-acryloxypropyldimethylmethoxysilane, γ-acryloxypropyltriethoxysilane, γ-acryloxypropylmethyldiethoxysilane, γ-acryloxypropyldimethylethoxysilane, vinyltriethoxysilane, γ-glycidoxypropyltrimethoxysilane, and γ-mercapto propyltrimethoxysilane.

Surface Shaping Layer 5: Reactive Silicone

The shaping sheet of the present invention preferably contains reactive silicone in the curable resin composition. The reactive silicone contained in the surface shaping layer 5 increases releasability of the sheet and durability of the sheet to repeated continuous use. Further, when an article to be shaped contains an additive or filler such as a pearl pigment, the effect of suppressing release of the additive or filler contained in the article to be shaped is obtained in the process of producing a decorative board.

Here, reactive silicone means a modified silicone oil that has an organic group introduced in a side chain or an end and also has reactivity depending on the property of the organic group introduced. Specific examples of the reactive silicone include modified silicone oil of the side chain type, modified silicone oil of the both ends type, modified silicone oil of the single end type, modified silicone oil of the side chain and both ends type, and so on in which the organic group to be introduced is one that causes amino modification, epoxy modification, mercapto modification, carboxyl modification, carbinol modification, phenol modification, methacryl modification, heterogenous functional group modification, and so on.

The above-mentioned reactive silicone reacts with a resin and binds thereto to be integrated thereto when the curable resin is cured. Therefore, when the decorative board of the present invention is molded by a thermal pressure molding method, the reactive silicone will not bleed out (not ooze) to the surface of the decorative board, so adhesion between the shaping sheet and the decorative board of the present invention can be considerably increased to make it possible to shape the decorative board with a fine design with a fine concavoconvex pattern.

The usage of the reactive silicone is within the range of about 0.1 to 50 mass parts, preferably about 0.5 to 10 mass parts per 100 mass parts of a curable resin. If the usage of the reactive silicone is 0.1 mass part or more, peeling of the surface of the shaping sheet from the decorative board is sufficient to maintain the concavoconvex pattern on the surface of the shaping sheet, which causes the shaping sheet to endure a longer period of use. On the other hand, if the usage of the reactive silicone is 50 mass parts or less, no shedding is generated when a base material is coated with the curable resin composition, so the coating surface is not coarse, thus increasing the coating stability.

Surface Shaping Layer 5: Various Additives

Further, the curable resin composition used in the present invention may contain various additives depending on desired physical properties of the obtained curable resin layer. Examples of the additive include weatherability improvers, abrasion resistance improvers, polymerization inhibitors, crosslinking agents, infrared absorbers, antistatic agents, adhesion improvers, antioxidants, leveling agents, thixotropy imparting agents, coupling agents, plasticizers, defoaming agents, fillers, and solvents.

Here, an ultraviolet absorber or a light stabilizer can be used as a weatherability improver. The weatherability improver is added in order that a shaping sheet may be used for a long period of time. Either an inorganic ultraviolet absorber or an organic ultraviolet absorber can be used. Titanium dioxide, cerium oxide, zinc oxide, or the like having an average particle size of about 5 to 120 nm can be preferably used as an inorganic ultraviolet absorber. Further, an example of the organic ultraviolet absorber includes a benzotriazole-based organic ultraviolet absorber. Specific examples of the organic ultraviolet absorber include 2-(2-hydroxy-5-methylphenyl)benzotriazole, 2-(2-hydroxy-3,5-di-tert-amylphenyl)benzotriazole, and 3-[3-(benzotriazol-2-yl)-5-tert-butyl-4-hydroxyphenyl]propionate of polyethylene glycol. Meanwhile, examples of the light stabilizer include a hindered amine-based light stabilizer. Specific examples of the light stabilizer include 2-(3,5-di-tert-butyl-4-hydroxybenzyl)-2'-n-bis(1,2,2,6,6-penta methyl-4-piperidyl)butylmalonate, bis(1,2,2,6,6-pentamethyl-4-piperidyl)sebacate, and tetrakis(2,2,6,6-tetramethyl-4-piperidyl)-1,2,3,4-butane tetracarboxylate. In addition, a reactive ultraviolet absorber or light stabilizer having a polymerizable group such as a (meth) acryloyl group in a molecule can be used as an ultraviolet absorber or a light stabilizer.

Examples of the abrasion resistance improver include spherical particles of inorganic substances such as α-alumina, silica, kaolinite, iron oxides, diamond, and silicon carbide. The shape of the particle is sphere, ellipsoid, polyhedron, scale, or the like and is not particularly limited. However, sphere is preferable. Examples of an organic abrasion resistance improver include beads of synthetic resins such as crosslinked acrylic resins and polycarbonate resins. Their particle size is usually about 30% to about 200% of the film thickness. Among these, spherical α-alumina is particularly preferable in that it has a high hardness and is highly effective for increasing abrasion resistance and also it is relatively easy to obtain spherical particles.

Examples of the polymerization inhibitor to be used include hydroquinone, p-benzoquinone, hydroquinone monomethyl ether, pyrogallol, and t-butylcatechol. Examples of the crosslinking agent to be used include a polyisocyanate compound, an epoxy compound, a metal-chelate compound, an aziridine compound, and an oxazoline compound.

Examples of the filler to be used include barium sulfate, talc, clay, calcium carbonate, and aluminum hydroxide.

Examples of the infrared absorber to be used include a dithiol-based metal complex, a phthalocyanine-based compound, and a diimmonium compound.

Formation of Surface Shaping Layer 5

In the present invention, the polymerizable monomer and polymerizable oligomer, which are the curable components, and various additives are mixed homogeneously in predetermined proportions to prepare a coating solution of a curable resin composition. The viscosity of the coating solution is not particularly limited as far as it can form an uncured resin layer on the surface of a base material by the coating method as described hereinbelow.

In the present invention, the coating solution thus prepared is applied by a known method such as gravure coating, bar coating, roll coating, reverse roll coating, or comma coating, or preferably gravure coating to form an uncured resin layer so that the thickness of the layers is 1 to 20 μm after curing. If the curable resin layer has a thickness after curing of 1 μm or more, a cured resin layer having desired capabilities can be obtained. The thickness of the surface shaping layer after curing is preferably about 2 to about 20 μm.

In the present invention, the uncured resin layer thus formed is irradiated with an ionization radiation such as an electron beam or ultraviolet ray to cure the uncured resin layer. Here, when the electron beam is used as the ionization radiation, its acceleration voltage may be selected as appropriate depending on the kind of the resin used and the thickness of the layer. However, it is preferable to cure the uncured resin layer usually at an acceleration voltage of about 70 to about 300 kV.

Note that in the irradiation with the electron beam, the higher the acceleration voltage is, the more increases the permeability. Accordingly, when a base material that is deteriorated by the electron beam is used, the acceleration voltage is selected such that the depth of permeation of electron beam is substantially equal to the thickness of the resin layer. This can prevent excessive irradiation of the base material with the electron beam, so deterioration of the base material by the excessive electron beam can be minimized.

Further, the dose of the electron beam is preferably such that the crosslinking density of the resin layer is saturated and is selected to be a value within the range of usually 5 to 300 kGy (0.5 to 30 Mrad) and preferably 10 to 50 kGy (1 to 5 Mrad).

Further, an electron beam source is not particularly limited and various electron accelerators, for example, those of Cockroft-Walton's type, Van de Graft type, a resonance transformer type, insulated core transformer type, or a linear type, Dynamitron type, and radio-frequency radiation type can be used.

When the ultraviolet ray is used as the ionization radiation, those including ultraviolet rays having a wavelength of 190 to 380 nm are applied. The ultraviolet ray source is not particularly limited and for example, a high pressure mercury lamp, a low pressure mercury lamp, a metal halide lamp, a carbon arc lamp, and so on can be used.

Various additives may be added to the cured resin layer thus formed to impart various functions, for example, a so-called hard coat function, i.e., to have a high hardness and anti-abrasion property, an antifogging coat function, an antifouling coat function, an antidazzling coat function, an antireflecting coat function, an ultraviolet ray shielding coat function, an infrared ray shielding coat function, and so on.

Then, among the shaping sheets of the present invention, the one that includes a base material having at least a transparent or translucent matted primer layer which contains a releasing agent and is provided all over the base material and a surface shaping layer partly provided on the primer layer has a matted primer layer 15. Hereinafter, the matted primer layer will be explained in detail.

Matted Primer Layer 15

The matted primer layer 15 is usually composed of a colorless or colored transparent ink containing a matting agent. Specifically, the ink is desirably a two-pack curing type resin that contains an acrylic resin, a polyester resin, an acrylurethane resin, or urethane resin having a functional group such as a hydroxyl group, a carboxyl group, or an amino group as a vehicle component and polyisocyanate as a curing agent.

Note that when a lustrous portion is shaped by the matted primer layer 15 and a matted portion is shaped by the surface shaping layer 4, the matted primer layer 15 does not have to contain a matting agent. The matting agent will be explained in detail hereinafter.

Further, it is preferable that the matted primer layer 15 contain a releasing agent. When there is no surface shaping layer just above the matted primer layer 15, the matted primer layer 15 serves as a shaping portion and directly contacts the base material, so it may in some cases be necessary to impart releasability thereto.

The releasing agent to be contained in the matted primer layer 15 is preferably reactive silicone. As the reactive silicone, the above-mentioned ones used in the surface shaping layer may be used while silicone (meth)acrylate is suitably used as the releasing agent in the matted primer layer. The releasing agent contained in the matted primer layer 15 increases releasability of the shaping sheet and also durability to repeated continuous use.

Silicone (meth)acrylate refers to a substance that is obtained by introducing (meth)acrylate having an ethylenically unsaturated double bond into a side chain and/or end of silicone and curing by irradiation with ionization radiation to cause it react with the resin to be bonded and integrated thereto.

Further, the reactive silicone is fixed by crosslinking reaction with polyisocyanate used in a two-pack curing resin. Therefore, when the decorative board of the present invention is molded by the thermal pressure molding method, the reactive silicone will not bleed out to the surface of the decorative board, so it is possible to considerably increase adhesion between the shaping sheet and the decorative board of the present invention and to shape the decorative board with a fine design with a fine concavoconvex pattern.

The addition amount of the reactive silicone used in the matted primer layer may be selected as appropriate depending on the kind of the silicone to be used, and so on. Usually, the addition amount of the reactive silicone is within the range of preferably 0.1 to 10 mass parts per 100 mass parts of ink solids. If the amount is within this range, silicone will not be transferred to the surface shaping layer 5 when performing gravure printing, and adhesion after crosslinking will not be inhibited.

Further, it is preferable that polymerization monomers or polymerizable oligomers, which are ionization radiation-curable components, be added to the matted primer layer 15. This can increase the heat resistance of the matted primer layer 15, and also adhesion with the surface shaping layer 5.

In addition, the matted primer layer 15 may contain various additives such as an extender pigment, a leveling agent, and a defoaming agent as appropriate.

In the case of the above-mentioned shaping sheet having a matted primer layer 15, it is preferable that the surface shaping layer 5 contain a releasing agent. The releasing agent is preferably silicone (meth)acrylate similarly to the matted primer layer. The releasing agent contained in the surface shaping layer 5 increases releasability of the shaping sheet and also durability to repeated continuous use.

The silicone (meth)acrylate contained in the surface shaping layer 5 can also considerably increase the adhesion between the shaping sheet and the decorative board when molding the decorative board by a thermal pressure molding method, and can shape the decorative board with a fine design with a fine concavoconvex pattern.

Further, in the case where the article to be shaped contains an additive or filler such as a pearl pigment, the effect of suppressing release of the additive or filler contained in the article to be shaped is obtained in the process of producing a decorative board.

The usage of the silicone (meth)acrylate is preferably within the range of about 0.1 to about 10 mass parts, more preferably about 0.5 to 5 mass parts per 100 mass parts of the ionization radiation-curable resin. If the usage of the silicone (meth)acrylate is 0.1 mass part or more, peeling of the decorative board from the surface of the shaping sheet is sufficient, so that the concavoconvex pattern on the surface of the shaping sheet is maintained, giving durability to a long period of use. On the other hand, if the usage of silicone (meth)acrylate is 10 mass parts or less, no shedding is generated when the base material is coated with the ionization radiation-curable resin composition, so the surface of the coating film does not become coarse, thus increasing the stability of the coating.

In the case of the above-mentioned embodiment having the matted primer layer 1S, it is preferable that the surface shaping layer 5 contain a matting agent. The content, particle size, particle size distribution, material, and shape of the matting agent are determined taking into consideration design properties upon shaping and in relation to the matting agent contained in the matted primer layer.

For example, regarding the content of the matting agent, a greater addition amount gives rise to a higher matting effect and a relatively high content of the matting agent in the surface shaping layer 5 as compared with the content of the matting agent in the matted primer layer 15 results in a recognition that the portion shaped by the surface shaping layer 5 is a matted portion and the portion corresponding to the portion of the exposed matted primer layer 15 is a lustrous portion. On the contrary, if the content of the matting agent in the matte primer layer 15 is made relatively high, then the portion shaped by the surface shaping layer 5 is recognized to be a lustrous portion. Specifically, it is preferable that the content of the matting agent be controlled within the range of 0 to 15 mass parts. Controlling within this range makes it possible to secure high design properties by a lustrous portion and a matted portion.

Note that in the present invention, when the lustrous portion is shaped by the matted primer layer 15 and the matted portion is shaped by the surface shaping layer 5, the matted primer layer 15 does not have to contain a matting agent. Further, the content of the matting agent in the surface shaping layer 5 is within the range of preferably 0.1 to 15 mass parts per 100 mass parts of the resin composition that constitutes the surface shaping layer.

Next, regarding the particle size of the matting agent, the matting effect is high when the average particle size of the matting agent is in a certain range. Specifically, it is preferable that the particle size be controlled within the range of 1 to 10 µm, more preferably 1 to 5 µm.

The matting agent may be either inorganic fine particles or organic fine particles. Examples of the inorganic fine particles include particles of silica, alumina, aluminosilicate, kaolinite, calcium carbonate, barium sulfate, glass, and the like. Examples of the organic fine particles include particles of acrylic resins, polycarbonate resins, urethane resins, urea resins, benzoguanamine resins, benzoguanamine-melamine-formaldehyde condensates, and the like. Among these, silica particles are preferable from the viewpoints of high matting effect and easy control. Further, the fine particles may be used alone or two or more of them may be used in combination.

Then, the present invention encompasses a resin decorative board that is formed by laminating an adhesive layer and a decorative sheet layer on a base material on the upper surface thereof in this order, coating the decorative sheet layer with a resin composition, abutting a shaping sheet on the resin composition, curing the resin composition to integrate it into the layers, and the shaping sheet and peeling the shaping sheet to form a resin layer.

The resin decorative board of the present invention will be explained by referring to FIG. 11.

The base material 10 of the resin decorative board of the present invention is not particularly limited and may be selected as appropriate from a plastic sheet, a metal plate, a plate from wood such as timber, ceramics materials, and so on depending on applications. When these base materials, in particular plastic sheets are used as the base material, one or both sides thereof may be subjected as desired to a physical or chemical treatment such as an oxidation method or an unleveling method in order to increase adhesion with the decorative material.

Examples of the oxidation method include a corona discharge treatment, a chromic acid treatment, a flame treatment, a hot-air treatment, and an ozone/ultraviolet ray treatment. Examples of the unleveling method include a sandblasting method and a solvent treatment. These surface treatments may be selected as appropriate depending on the kind of the base material. Generally, the corona discharge treatment is preferably used from the viewpoint of effect and handleability.

As a plastic sheet, there may be given a plastic sheet composed of any of various synthetic resins. Examples of the synthetic resins include a polyethylene resin, a polypropylene resin, a polymethylpentene resin, a polyvinyl chloride resin, a polyvinylidene chloride resin, a polyvinyl alcohol resin, a vinyl chloride-vinyl acetate copolymer resin, an ethylene-vinyl acetate copolymer resin, an ethylene-vinyl alcohol copolymer resin, a polyethylene terephthalate resin, a polybutylene terephthalate resin, a polyethylene naphthalate-isophthalate copolymer resin, a polymethyl methacrylate resin, a polyethyl methacrylate resin, a polybutyl acrylate resin, a polyamide resin typified by nylon 6 or nylon 66, a cellulose triacetate resin, a cellophane, a polystyrene resin, a polycarbonate resin, a polyallyate resin, and a polyimide resin.

As the metal plate, for example, those made of aluminum, iron, stainless steel, or copper may be used. Alternatively, those plates to which these metals are applied by, for example, plating may be used.

The plates from wood include wood materials such as sliced veneer, single panel of wood material, plywood laminate, particle board, and medium density fiber board (MDF) of various materials such as Japanese cedar, cypress, zelkova, pine, lauan, teak, and melapee. These may be used alone or as laminates. Note that the plate from wood are not limited to wood plates but also include plastic boards that contain paper powder, and papers having reinforced strengths.

Examples of ceramics materials include ceramic construction materials such as a gypsum board, a calcium silicate plate, and a wood chip cement board, ceramics, glass, enamel, baked tiles, and boards composed of mainly of volcano ash.

Beside these, composite materials from various materials such as a fiber reinforced plastic (FRP) board, a board including a paper honeycomb having applied on each side thereof an iron plate, a board including two aluminum plates and a polyethylene resin sandwiched therebetween may be used as the base material.

The adhesive layer 9 is a layer that is provided to bond the base material 10 and the decorative sheet 17.

The adhesive that constitutes the adhesive layer 9 is applied by using a coating apparatus such as a spray, a spreader, or a bar coater. The adhesive may be based on urea, a vinyl acetate resin, a urea resin, a melamine resin, a phenol resin, isocyanate, or the like and are used alone or as mixed adhesives in any desired proportions. The adhesives may be used after mixing therewith inorganic powders such as talc, calcium carbonate, clay, and titanium white, wheat flour, wood powder, plastic powder, colorants, insecticides, and fungicides, as necessary. Generally, the adhesive is adjusted to contain 35 to 80 mass % of solids and is applied on a surface of a base material in a coating amount within the range of 50 to 300 $g/m^2$.

Usually, the decorative sheet layer 17 is affixed to the base material 10 by forming the adhesive layer 9 on the backside of the decorative sheet layer 17 of the present invention and affixing the base material 10 to the adhesive layer 9, or applying an adhesive on the base material 10 and affixing the decorative sheet layer 17 thereto. The affixing may be performed by using an affixing apparatus such as a cold press, a hot press, a roll press, a laminator, a wrapping apparatus, an edge binder, or a vacuum press.

The decorative sheet layer 17 is to impart decorativeness to the resin decorative board of the present invention and includes a sheet layer 17-a and a solid printing layer 17-b optionally provided on the sheet layer 17-a, and a picture layer 17-c provided in this order.

The sheet layer 17-a is not particularly limited as far as it is a base material that is usually used for a decorative sheet and may be selected as appropriate from various kinds of paper, plastic films, plastic sheets, and so on depending on applications. These materials may be used alone or as laminates by any combinations thereof, such as composites of paper, or composites of paper and a plastic film.

When these base materials, in particular, plastic films or plastic sheets are used as the base material, one or both sides of the base material may be subjected to a physical or chemical surface treatment such as an oxidation method or an unleveling method as desired in order to increase the adhesion with an overlying layer to be provided.

Examples of the oxidation method include a corona discharge treatment, a chromic acid treatment, a flame treatment, a hot-air treatment, and an ozone/ultraviolet ray treatment. Examples of the unleveling method include a sandblasting method and a solvent treatment. These surface treatments may be selected as appropriate depending on the kind of the base material. Generally, the corona discharge treatment is preferably used from the viewpoint of effect and handleability.

The base material may be subjected to a treatment such as a treatment for forming a primer layer thereon. A coating for adjusting the color or a pattern from the viewpoint of design may be formed on the base material in advance.

Examples of the various kinds of paper used as the sheet layer 17-a include tissue paper, craft paper, and titanium paper. These paper base materials may further be added (impregnation after paper making or filling in after paper making), in addition to a paper material, resins such as an acrylic resin, styrene-butadiene rubber, a melamine resin, and a urethane resin in order to increase interfilament strength in the paper base material or interlayer strength between the paper base material and another layer, or to prevent scuffing. It may be, for example, interpaper strengthened paper, resin-impregnated paper, or the like.

Besides these, examples of the paper base material include various kinds of paper that are used in the field of construction materials such as linter paper, a card board, base paper for a gypsum board, vinyl wallpaper having provided a vinyl chloride resin layer on a surface thereof. Further, coated paper, art paper, sulfate paper, glassine paper, parchment paper, paraffin paper, or Japanese paper which is used in the field of office work and for typical printing, wrapping, or the like can be used. In distinction to the paper, woven or nonwoven fabrics of various fibers having appearance and properties similar to those of paper may also be used as the base material. Various fibers include inorganic fibers such as a glass fiber, an asbestos fiber, a potassium titanate fiber, an alumina fiber, a silica fiber, and a carbon fiber, and synthetic resin fibers such as a polyester fiber, an acrylic fiber, and a vinylon fiber.

As a plastic film or a plastic sheet, there may be given a plastic film or a plastic sheet composed of any of various synthetic resins. Examples of the synthetic resins include a polyethylene resin, a polypropylene resin, a polymethylpentene resin, a polyvinyl chloride resin, a polyvinylidene chloride resin, a polyvinyl alcohol resin, a vinyl chloride-vinyl acetate copolymer resin, an ethylene-vinyl acetate copolymer resin, an ethylene-vinyl alcohol copolymer resin, a polyethylene terephthalate resin, a polybutylene terephthalate resin, a polyethylene naphthalate-isophthalate copolymer resin, a polymethyl methacrylate resin, a polyethyl methacrylate resin, a polybutyl acrylate resin, a polyamide resin typified by nylon 6 or nylon 66, a cellulose triacetate resin, a cellophane, a polystyrene resin, a polycarbonate resin, a polyallylate resin, and a polyimide resin.

The thickness of the sheet layer 17-a is not particularly limited. However, when a sheet prepared from a plastic as a material is used, the thickness of the sheet is usually within the range of about 20 to about 150 μm, preferably 30 to 100 μm, and when a paper base material is used, a basis weight is usually within the range of about 20 to about 150 $g/m^2$, preferably 30 to 100 $g/m^2$.

The solid printing layer 17-b provided on the sheet layer 17-a is a layer that is also referred to as a shield layer provided as desired to increase the design properties of the resin decorative board of the present invention. The solid printing layer 17-b is to provide an intended color on the surface of the sheet layer 17-a when the sheet layer 17-a itself is colored or has an uneven color by adjusting the color of the surface of the sheet layer 17-*a*. Usually, the solid printing layer 17-*b* is often formed with an opaque color. However, it is in some cases formed with a transparent color to make use of the pattern that the underlayment has. In the case where white color that the sheet layer 17-*a* itself has is to be made use of or where the sheet layer 17-*a* itself is appropriately colored, it is unnecessary to form the solid printing layer 17-*b*.

The ink used in the formation of the solid printing layer 17-*b* includes a binder that contains a colorant such as a pigment or a dye, an extender pigment, a solvent, a stabilizer, a plasticizer, a catalyst, a curing agent, and so on as appropriate. The binder is not particularly limited and may be selected from any of a polyurethane resin, a vinyl chloride/vinyl acetate copolymer resin, a vinyl chloride/vinyl acetate/acrylic copolymer resin, a chlorinated polypropylene resin, an acrylic resin, a polyester resin, a polyamide resin, a butyral resin, a polystyrene resin, a nitrocellulose resin, a cellulose acetate resin, and so on. Any of the binders may be used alone or two or more of them may be used as mixtures.

Example of the colorants that can be used include: inorganic pigments such as carbon black (sumi ink), iron black, titanium white, antimony white, yellow lead, titanium yellow, iron oxide red, cadmium red, ultramarine blue, and cobalt blue; organic pigments or dyes such as quinacridone red, isoindolinone yellow, and phthalocyanine blue; metallic pigments composed of scaly foils of aluminum, brass, and the like; and pearl pigments composed of scaly foils of titanium dioxide-covered mica, basic lead carbonate, and the like.

The picture layer 17-*c* is to impart decorativeness to the sheet layer 17-*a* and is formed on the sheet layer 17-*a* or on the solid printing layer 17-*b* by printing various patterns using an ink and a printer. Examples of the pattern include wood grain patterns, stone grain patterns imitating rock surfaces such as marble stone patterns (for example, travertine marble stone patterns), textile patterns imitating cloth texture patterns and cloth-like patterns, tiling patterns, brickwork patterns, and so on as well as composites of these such as mosaic patterns and patchwork patterns. These patterns may be formed by polychrome printing using ordinary process colors, i.e., yellow, red, blue, and black. Alternatively, they can be formed by a polychrome printing by specialty colors or the like, including providing plates for respective colors that constitute the pattern.

A picture ink used for the picture layer 17-*c* may be similar to the ink used for the solid printing layer 17-*b*.

The resin layer 18 is a layer that is formed by applying a resin composition on the decorative sheet layer 17 and abutting a shaping sheet thereto, integrally curing the resultant, and then peeling the shaping sheet. The thickness of the resin layer 18 is preferably 100 to 500 g/m$^2$, more preferably 100 to 350 g/m$^2$, and still more preferably 150 to 250 g/m$^2$.

The resin composition is a composition including a resin and additives that are added as necessary, such as a polymerization initiator, a polymerization accelerator, a polymerization inhibitor, and so on.

The resin in the resin composition used in the present invention is not particularly limited as far as it cures at room temperature or by heating and examples thereof include silicone resins, unsaturated polyester resins, saturated polyester resins, melamine resins, phenol resins, polyamides, ketone resins, epoxy resins, urethane resins, urea resins, acrylic resins, vinyl resins, alkyd resins, aminoalkyd resins, hydrocarbon resins (aromatic and aliphatic), rubber resins, and fluororesins. Among these, silicone resins and unsaturated polyester resins are preferable.

The polymerization initiators, polymerization accelerators, and polymerization inhibitors are added to adjust the curing speed of the resin composition.

The polymerization initiator to be used is selected as appropriate from peroxides such as methyl ethyl ketone peroxide, benzoyl peroxide, and hydroperoxide and radical initiators such as azobisisobutyronitrile. The addition amount of the polymerization initiator in the resin composition is preferably 0.5 to 3 mass % and more preferably 0.5 to 2.0 mass %.

As the polymerization accelerator, for example, metal compounds such as a cobalt compound, e.g., cobalt naphthenate, a vanadium compound, and a manganese compound, and amine compounds such as dimethylnitrile are used in a proportion to the resin composition of 0.1 to 2.0 mass % and more preferably 0.3 to 1.0 mass %. As the polymerization inhibitor, for example, hydroquinone, trihydroquinone, benzoquinone, trihydrobenzene, and so on may be used. Preferable examples of the other additives include compounds having a vinyl group, such as styrene monomers for adjusting coating viscosity and crosslinking the resin. The addition amount thereof in the resin composition is preferably 10 to 40 mass % and more preferably 15 to 30 mass %.

Any one of the curing speed adjusters and additives may be used alone, or two or more of them may used in combination.

The resin decorative board of the present invention can be obtained by shaping the resin layer 18 by using the above-mentioned shaping sheet of the present invention. Alternatively, the resin decorative board of the present invention can be similarly obtained by using other shaping sheets.

The other shaping sheets that can be used in the present invention include those obtained by forming a pattern layer on a base layer with an ink selected from the group consisting of (a) a repellent ink containing a binder that has repellency in itself, (b) a repellent ink that includes a binder having no repellency in itself to which is added an additive having repellency, and (c) a repellent ink that includes a binder having repellency in itself, to which is added an additive having repellency, applying an ionization radiation-curable resin composition containing a releasing agent on the pattern layer to form a coating layer, forming a concave portion on the coating layer formed above the pattern layer by repellent action between the resultant repellent pattern layer and the coating layer thus formed, and irradiating the coating layer thus formed with an ionization radiation to cure the coating layer formed with concaves and convexes in conformity with the pattern layer.

The structure of the shaping sheet 1 will be explained by referring to FIG. 12. FIG. 12 is a schematic diagram showing a cross-section of the shaping sheet 1. In the example shown in FIG. 12, the shaping sheet 1 includes a base material 2 on which are present a penetration preventing layer 6 covering the whole surface of the base material 2, a pattern layer 19 having repellency, and a coating layer 20 (the same as the surface shaping layer 4) made of a crosslinked and cured ionization radiation-curable resin composition. The shaping sheet 1 can be obtained by applying an ionization radiation-curable resin composition on a pattern layer 19 which is partially present on the base material, forming a concave pattern 14 in the coating layer 20 formed above the pattern layer 19 by repellent action between the pattern layer 19 thus formed having repellency and the coating layer 20 made of the ionization radiation-curable resin composition, and irradiating the coating layer thus formed with an ionization radiation to crosslink and cure the coating layer formed with a concavoconvex pattern in conformity with the pattern layer 19.

The pattern layer 19 of the shaping sheet 1 is a layer which is to be laminated on the penetration preventing layer 6 or the like provided as necessary as shown in FIG. 12 and has repellency for forming a concave pattern on the surface of the coating layer 20. This layer is formed by preparing gravure plates having various kinds of patterns and printing by gravure printing. Further, to obtain good repellency, it is preferable that the coating amount of the repellent ink be set such that the depth of printing gradient (coating thickness) is 30 to 60 μm.

The concavoconvex pattern of the shaping sheet in the present invention is obtained by forming the concave pattern 14 in the coating layer 20 above the pattern layer 19 by the repellent action between the pattern layer 19 having repellency and the coating layer 20 made of the ionization radiation-curable resin composition.

As described above, the ink having repellency for forming the pattern layer 19 is an ink selected from the group consisting of (a) a repellent ink containing a binder that has repellency in itself, (b) a repellent ink that includes a binder having no repellency in itself to which is added an additive having repellency, and (c) a repellent ink that includes a binder having repellency in itself to which is added an additive having repellency.

Repellent Ink (a)

The resin used in the binder of the repellent ink (a) is not particularly limited as far as it is a resin that satisfies the relationship [critical surface tension of binder<surface tension of ionization radiation-curable resin composition (liquid state)]. Examples of the resin include fluororesins such as polyvinylidene fluoride and polyvinyl fluoride, silicone resins such as polysiloxane and silicone (meth)acrylate, and copolymer resins of a fluororesin, a silicone resin, and an/acrylic resin.

The repellent ink (a) preferably contains an extender pigment to improve the transferability of the ink. The inclusion of the extender pigment can impart thixotropy to ink and allows the pattern of the pattern layer 19 to be maintained when the pattern layer 19 is printed using a printing plate. This enables sharpness of the concavoconvex pattern at an edge portion where a convex portion transitions into a concave portion to be emphasized, thus making it possible to make a well-modulated expression of a design.

The extender pigment is not particularly limited and may be selected as appropriate from, for example, silica, talc, clay, barium sulfate, barium carbonate, calcium sulfate, calcium carbonate, magnesium carbonate, and so on.

Further, to obtain a fine design, a matting agent may be added to the repellent ink. As the matting agent, silica is preferable in that it has a high freedom of design of materials and excellent coating stability. The particle size of the matting agent is within the range of preferably 2 to 5 μm. The addition amount of the matting agent is within the range of preferably 1 to 5 mass %.

The shaping sheet may be either colored or non-colored. To confirm the state of the concavoconvex pattern, it is preferable that the shaping sheet be colored. Examples of the pigment to be added to the repellent ink (a) for the purpose of coloring the shaping sheet include known coloring pigments such as quinacridone red, isoindolinone yellow, phthalocyanine blue, phthalocyanine green, titanium oxide, and carbon black.

Repellent Ink (b)

The substances (b) having repellency include in addition to the resins used for the binder of the repellent ink (a) such as a silicone resin and a fluororesin, polyolefin resins such as polyethylene and polypropylene, waxes, and so on. Further, the binders that have no repellency in themselves and can be preferably used include aminoalkyd resins, acrylic resins, polyester resins, and urethane resins generally commercially available as melamine alkyd resins and urea alkyd resins and so on.

Note that the repellent ink (b), like the repellent ink (a), may contain an extender pigment and a matting agent. Specifically, those exemplified for the repellent ink (a) can be used.

Repellent Ink (c)

As the binder (c) having repellency, those resins exemplified for the repellent ink (a) can preferably be used. However, ionization radiation-curable resins may be preferably used. The ionization radiation-curable resins are the same as those mentioned above. Further, the extender pigments and the matting agents may be the same as those exemplified for the repellent ink (a).

Note that the additives having repellency are added in order to obtain sufficient repellency of the repellent ink (c) and sufficient releasability of the shaping sheet. Examples thereof include silicone resins and fluororesins.

The ionization radiation-curable resin composition used in the coating layer 20 of the shaping sheet 1 may be the same as that mentioned above.

Further, the base material 2 may be the same as that mentioned above.

Next, the other shaping sheets that can be used in the present invention include those obtained by forming an ink layer on a base layer over the whole surface thereof with an ink selected from the group consisting of (a) a repellent ink containing a binder that has repellency in itself, (b) a repellent ink that includes a binder having no repellency in itself to which is added an additive having repellency, and (c) a repellent ink that includes a binder having repellency in itself to which is added an additive having repellency, applying a curable resin composition containing a releasing agent on the ink layer to form a coating layer, forming a convex portion on the coating layer formed above the ink layer by repellent action between the ink layer and the coating layer thus obtained, and curing the coating layer having the convex portion thus formed.

The structure of the shaping sheet 1 will be explained by referring to FIG. 13. FIG. 13 is a schematic diagram showing a cross-section of the shaping sheet 1. In the example shown in FIG. 13, the shaping sheet 1 includes a base material 2 on which are present a penetration preventing layer 6 covering the whole surface of the base material 2, an ink layer 3 having repellency, and a coating layer 20 made of a crosslinked and cured product of a curable resin composition. The ink layer 3 having repellency is present over the whole surface of the base material 2. The curable resin composition is applied on the ink layer 3, and due to the repellent action between the ink layer 3 having repellency and the coating layer 20 made of the curable resin composition thus formed, the coating layer 20 forms a convex pattern 16 made of the curable resin composition formed above the ink layer 3. Further, the coating layer forming a convex pattern thus formed is crosslinked and cured, and as a result, a shaping sheet 1 having a concavoconvex pattern can be obtained.

Note that the base material 2, the penetration preventing layer 6, and the coating layer 20 can be obtained from the same materials by the same method as mentioned above.

Next, the other shaping sheet used in the present invention encompasses a decorative material that includes a base material and a surface shaping layer made of a crosslinked and cured product of an ionization radiation-curable resin composition, and at least an ink layer and an interaction preventing layer laminated in this order from a base material side between the base material and the surface shaping layer, in which the ink layer is formed on a portion where an interaction region is to be developed or on the whole surface of the base material, and the interaction preventing layer is formed as having a shape such that the portion that develops the interaction region is cut out.

The structure of the shaping sheet 1 will be explained by referring to FIGS. 14 and 15. The shaping sheet 1 is composed of a base material 2, an ink layer 3, an interaction preventing layer 21, a surface shaping layer 5, and a penetration preventing layer 6, and so on.

The surface shaping layer 5 is made of a crosslinked and cured product of the ionizing radiation-curable resin composition and covers the outermost surface of the decorative sheet 1. The ink layer 3 is made of a material having permeability to uncured ionizing radiation-curable resin composition that forms the surface shaping layer 5 and is formed so as to have a desired concavoconvex pattern. On the other hand, an interaction preventing layer 21 is made of a material not having permeability to the uncured ionizing radiation-curable resin composition that forms the surface shaping layer 5 and is laminated on the base material 2 or the penetration preventing layer 6 that is optionally provided in contact with the surface shaping layer 5. Further, the interaction preventing layer 21 has a shape having a cut out portion 21a obtained by cutting out the portion where the interaction region is to be developed. Accordingly, the ink layer 3 is present in the cut out portion 21a and the uncured ionizing radiation-curable resin composition that forms the surface shaping layer 5 is laminated in the cut out portion 21a in a state where it contacts the ink layer 3.

Further, the interaction preventing layer 21 is laminated in a thickness larger than that of the ink layer 3. Therefore, the uncured ionizing radiation-curable resin composition, which is a material of the surface shaping layer 5 laminated on the interaction preventing layer 21 including the cut out portion 21a, is laminated in the cut out portion 21a in a state where it contacts the ink layer 3.

The ink layer 3 is laminated directly on the base material 2 or on the penetration preventing layer 6 that is provided as necessary and accordingly, it may be provided partly as shown in FIG. 14 or all over the surface as shown in FIG. 15.

The ink layer 3 is a layer that generates a convex pattern on the surface of the surface shaping layer. Regarding the range in which the ink layer 3 is laminated, it is not necessary to form it by selecting the region where it is desired to form a concavoconvex pattern but it may be laminated all over the surface of the base material 2 (so-called solid printing). Therefore, even in the case of a fine pattern such that the portion where it is desired to form a convex pattern is about 100 μm in width, it can be readily produced.

The ink composition that forms the ink layer 3 has properties capable of exhibiting interactions such as elution, dispersion, mixing, and so on between it and the ionizing radiation-curable resin composition that forms the surface shaping layer 5, and is selected as appropriate in relation to the ionizing radiation-curable resin composition (uncured preparation).

The mechanism of the generation of a concavoconvex pattern on the surface shaping layer 5 of the shaping sheet 1 is presumed to be as follows. The interaction preventing layer 21 has a shape such that the portion where an interaction region is to be developed is cut out and is laminated on the ink layer 3 and when the uncured preparation of the ionizing radiation-curable resin composition is applied for forming the surface shaping layer 5, the resin component of the ink layer 3 is partly eluted, dispersed, mixed, or permeates into the surface protecting layer in the cut out portion 21a of the interaction preventing layer 21 or in the vicinity thereof. In this case, the respective resin components in the ink composition in the ink layer 3 and the uncured preparation of the ionizing radiation-curable resin composition do not attain a complete compatible state in a short period of time but remain in a suspension state in the portion just above the ink layer 3 or in the vicinity thereof, that is the portion in the cut out portion of the interaction preventing layer 21 and in a suspension state is considered to constitute the interaction region 4. It is presumed that crosslinking and curing the surface shaping layer while keeping it in a suspension state, when such a state is fixed, results in formation of the interaction region 4 in the surface shaping layer and that portion develops a convex pattern.

Further, since the interaction region 4 is formed mainly in the cut out portion 21a in the interaction preventing layer 21, the shape of the interaction region 4 is such that it does not extend over the width of the cut out portion 21a, so a convex pattern having a sharp design based on the picture is formed.

On the other hand, above the interaction preventing layer 21, the interaction region 4 as mentioned above is not developed so that there occurs no convex pattern, resulting in that a concavoconvex pattern will appear on the surface of the shaping sheet 1 depending on the presence or absence of the interaction preventing layer 21.

The same ink composition as that mentioned above may be used as the ink composition that forms the ink layer 3. The coating amount of the ink composition that forms the ink layer 3 is within the range of preferably 1 to 30 g/m$^2$. If the coating amount of ink is 1 g/m$^2$ or more, the above-mentioned interaction between the ink composition and the ionizing radiation-curable resin composition is sufficient, so a sufficient concavoconvex pattern can be obtained on the surface of the decorative material. On the other hand, if the coating amount of ink is 30 g/m$^2$ or less, no mechanical restriction is posed when the ink composition is subjected to printing and economically advantageous. From the above-mentioned viewpoints, the coating amount of ink is more preferably within the range of 2 to 10 g/m$^2$.

The interaction preventing layer 21 is laminated on the ink layer 3 and is laminated as sandwiched between the surface shaping layer 5 overlying it and the ink layer 3. The interaction preventing layer 21 has a shape of having a cut out portion 21a formed by cutting out the portion where the interaction region is to be developed as described above. For example, in the case where a wood grain pattern is to be expressed, the shape of the interaction preventing layer 21 is a shape of the wood grain from which a conduit portion is cut out. In the case where a tiling pattern is to be expressed, the shape of the interaction preventing layer 21 is a shape of a joint groove portion is cut out. The interaction preventing layer 21 taking such a shape allows the ionizing radiation-curable resin composition that is a material for the surface shaping layer 5 and the ink layer 3 which are penetrating into the cut out portion 21a to contact each other while the other portion is in a state where it is shielded by the interaction preventing layer 21. Therefore, the interaction preventing layer 21 is a layer that forms the interaction region 4 in the cut out portion while it prevents the interaction region from being developed in the other portions.

The interaction preventing ink composition that forms the interaction preventing layer 21 has properties not to develop interactions such as elution, dispersion, and mixing between it and the ionizing radiation-curable resin composition that forms the surface shaping layer 5 and is selected as appropriate in relation to the ionizing radiation-curable resin composition (uncured preparation). Specifically, the ink composition is preferably an ink composition that contains a crosslinkable resin composition capable of shielding as a binder resin. For example, polyester polyol, acrylic polyol, and polyvinyl butyral are preferable.

The coating amount of the interaction preventing ink composition that forms the interaction preventing layer 21 is within the range of preferably 1 to 30 g/m$^2$. If the coating amount of the ink composition is 1 g/m$^2$ or more, the above-mentioned interaction between the ink composition that forms the ink layer 3 and the ionizing radiation-curable resin composition can be shielded, so that a sufficient concavoconvex pattern can be given to the surface of the decorative material. On the other hand, if the coating amount of the ink composition is 30 g/m$^2$ or less, no mechanical restriction is posed when the ink composition is subjected to printing and economically advantageous. From the above-mentioned viewpoints, the coating amount of the interaction preventing ink composition is more preferably within the range of 2 to 10 g/m$^2$.

However, in the case where the interaction preventing layer 21 is made thicker than the ink layer 3 as in the case of the shaping sheet 1 as shown in FIGS. 14 and 15, the coating amount of the interaction preventing ink composition is within the range of 1 to 30 g/m$^2$ and further 2 to 10 g/m$^2$ while the coating amount of the ink composition that forms the ink layer 3 is within the range of preferably 1 to 20 g/m$^2$ and further 2 to 5 g/m$^2$. Further, the thicknesses of the coating films in this case are preferably 1 to 30 µm and further 2 to 10 µm for the interaction preventing ink composition, and 1 to 20 µm and further 2 to 5 µm for the ink composition that forms the ink layer 3.

As the base material 2, the penetration preventing layer 6, and the ionizing radiation-curable resin in the ionizing radiation-curable resin composition that constitutes the surface shaping layer 5 which are used for the shaping thereof, those as mentioned above may be used. Besides, various additives, the method of forming the surface shaping layer, and so on may also be the same as mentioned above.

Further, as the base material 2 used for the shaping sheet, those as mentioned above may be used and, in particular, the above-mentioned polyester film is preferable.

The thickness of the base material is not particularly limited and usually it is about 20 to about 150 µm and preferably 30 to 100 µm.

Further, when the polyester film is used as the base material, it is preferable that the base material have a weight loss of 1.0 mass % or less and further 0.65 mass % or less as measured by immersing it in xylene at 140° C. for 24 hours and then drying. The method of decreasing the weight loss by immersion in xylene is similar to that mentioned above.

The method of producing the decorative board according to the present invention relates to providing a shaping sheet to an article to be shaped. This is done as follows. Usually, a shaping sheet is molded by being inserted between a molded article and one of heated pressure plates between which the molded article is produced by being pressed, the whole is subjected to heat-pressing, and the shaping sheet is then peeled from the article to be shaped to obtain a decorative board having a certain pattern shaped thereon. Specifically, as shown in FIG. 16, a decorative board 11 having a certain pattern is obtained by peeling the shaping sheet 1 from the decorative board (article to be shaped) 11 after the heat-pressing.

The article to be shaped in the present invention is not particularly limited as far as it is a decorative board that is fabricated by using the shaping sheet of the present invention. From the viewpoints of hard surface, excellent heat resistance and excellent contamination resistance, and capability of selecting a wide variety of color patterns in design property, examples of the article to be shaped include melamine resin decorative boards, diallyl phthalate (DAP) resin decorative boards, polycarbonate resin decorative boards, and polyester decorative boards. In particular, melamine resin decorative boards and diallyl phthalate (DAP) resin decorative boards are preferable. The method of producing these decorative boards is not particularly limited and any generally known methods may be used. For example, the decorative board of the present invention can be obtained by the following production methods.

The melamine resin decorative board can be obtained by laminating a melamine resin impregnated sheet and then a melamine resin impregnated overlay paper on about 4 sheets of a phenol resin impregnated core paper, sandwiching the resultant between two mirror-surface metal plates, inserting the above-mentioned shaping sheet on the surface, heat-pressing, for example, at 0.98 MPa and 160° C. for 20 minutes, leaving the molded article to cool to room temperature, and peeling the shaping sheet.

The diallyl phthalate (DAP) resin decorative board can be obtained by laminating diallyl phthalate resin impregnated papers on a plate-like base material in order, heat-pressing the resultant at 140 to 150° C. and 0.98 MPa for about 10 minutes between mirror-surface metal plates using the above-mentioned shaping sheet in the same manner as in the production method of the melamine resin decorative board, leaving the molded article to cool to room temperature, and peeling the shaping sheet. Both the decorative boards have fine concavoconvex patterns.

Then, the present invention encompasses a method of producing a decorative board using a shaping sheet in which the article to be shaped contains a design property-imparting pigment and the surface shaping layer is a crosslinked and cured product of an ionizing radiation-curable resin composition that contains a reactive silicone. Here, the design property-imparting pigment means a pigment to be added to impart design properties to a decorative board, and specific examples thereof include a pearl pigment, a silver pigment, and a titanium pigment.

The production method of the present invention is characterized in that the surface shaping layer contains a reactive silicone, which enables shaping having a fine concavoconvex pattern and elaborate shaping with a high-grade feeling and provides excellent releasability, and the design property-imparting pigment such as a pearl pigment contained in the article to be shaped does not separated.

As the reactive silicone that can be used in this method, those similar to the above-mentioned reactive silicones may be used. The structure of the shaping sheet is not particularly limited as far as the surface shaping layer contains a reactive silicone.

The decorative board produced by the method of the present invention can be used as applied to various substrates. Specifically, as shown in FIG. 17, the decorative board 11 is abutted to the substrate 10 through the adhesive layer 9.

The substrate 10, which serves as an adherend, the adhesive used for the adhesive layer 9, and the method of bonding are as mentioned above.

The construction materials produced as mentioned above may be provided with any desired decoration by optionally cutting the construction materials, and performing groove processing, chamfer processing, or the like on the surface or end grain portions thereof by using a cutting machine such as a router or a cutter. Such construction materials can be used in various applications, for example, interior or exterior materials of a building, such as walls, ceilings, and floors, surface decorative boards for fittings, such as window frames, doors, handrails, baseboards, circumferential hem, and lacing, surface decorative boards for kitchen, furniture, or cabinets of weak electric appliances or OA appliances, and interiors or exteriors of vehicles.

EXAMPLE

Now, the present invention will be explained in more detail by way of examples. However, the present invention should not be limited thereto.
Evaluation Method The shaping sheets and decorative boards obtained in each example were evaluated by the following methods.
(1) Measurement of Surface Roughness Target samples for evaluation having a size of 400 mm in length×400 mm in width were prepared and determined for surface shape, surface roughness (arithmetic average surface roughness), effect of shaping and molding reproducibility when used repeatedly by using a three-dimensional non-contact surface shape measuring system (Micromap, manufactured by Ryoka Systems Inc.).
(2) Peelability Peel strength of shaping sheets was measured by using a tensile compactor (RTC-1250A, manufactured by Orientech Co., Ltd.). Target samples for evaluation having a size of 25 mm in width×50 mm in length were prepared and tested at a peeling speed of 300 mm/min, a peeling direction of 180° (vertical direction), a load cell weight 10 N, and a measurement environment temperature of 23° C. (room temperature).
(3) Continuous Molding Competence Molding was performed 10 times using the same shaping sheet and peel strength for each molding was measured to measure peeling stability when the shaping sheet is used repeatedly.
(4) Observation of Surface Shape.

Surface shape (surface concave and convex, concavoconvex pitch), determination of the effect of the shaping sheet, and molding reproducibility of the shaping sheet when used repeatedly were observed by using an electron microscope ("S-2400 Model Scanning Electron Microscope", manufactured by Hitachi High-Technologies Corporation)

Example 1

A penetration preventing layer 6 (primer layer) was formed by gravure printing a primer ink (acrylic ink "EBF Tuning Primer", manufactured by Showa Ink Manufacturing Co., Ltd.) all over the adhesion facilitation-treated surface of an already adhesion facilitation-treated polyester film ("A4100 (50 μm)", manufactured by Toyobo Co., Ltd.).

Then, an ink (a urethane conduit ink "CONDUIT MINI (A)", manufactured by Inktech Inc) was subjected to printing with a pattern plate to form an ink layer 3. Further, an electron beam-curable resin composition including an electron beam-curable resin ("REB-GE", manufactured by Dainichiseika Color & Chemicals Mfg. Co., Ltd.) to which 5 wt % of calcined kaolin particles and 2 wt % of reactive silicone methacrylate was added was applied to the ink layers in a coating amount of 4 g/m² by a gravure offset coating method. After the coating, an electron beam of acceleration voltage of 175 kV and an irradiation dose of 30 kGy (3 Mrad) was applied thereto to cure the electron beam-curable resin composition to form a surface shaping layer 5, thus obtaining a shaping sheet. The shaping sheet is a film that has a fine concavoconvex pattern with a high-grade feeling.

Example 2

On about 4 sheets of a phenol resin impregnated core paper, a melamine resin impregnated sheet and then an about 35 g/m² overlay paper impregnated with a melamine resin were laminated in order and the resultant laminate was sandwiched between two mirror-surfaced metal plates and the shaping sheet having a concavoconvex pattern on the surface thereof produced in Example 1 was inserted on the surface, and heat-pressed at 0.98 MPa and 160° C. for 20 minutes.

After leaving the molded article to cool to room temperature, the shaping sheet was peeled off to obtain a melamine resin decorative board having a fine concavoconvex pattern on the surface thereof.

Comparative Example 1

On the adhesion facilitation-treated surface of an already adhesion facilitation-treated PET film ("A4100 (100 μm)", manufactured by Toyobo Co., Ltd.) was formed a convex pattern layer of urethane acrylate ultraviolet-curing resin (XD-808, manufactured by Dainichiseika Color & Chemicals Mfg. Co., Ltd.) by a drum printing film (hereinafter, referred to as "DPS") method.

All over the surface of a roll concave plate was provided with a concavoconvex pattern (70 μm in depth, 35 μm each for widths of the convex portion and the concave portion) by etching. Note that the line speed of the DPS method was 10 m/min and two ozone high pressure mercury lamps (manufactured by GS Yuasa Corporation) of 160 W for irradiation of ultraviolet rays.

The shaping sheet thus obtained had a concavoconvex pattern. By using the shaping sheet, the same procedure as that in Example 2 was repeated to fabricate a melamine resin decorative board.

Example 3

On the adhesion facilitation-treated surface of an already adhesion facilitation-treated PET film ("A4100 (25 μm)", manufactured by Toyobo Co., Ltd.) was printed a silicone repellent resin ("REP", manufactured by Dainichiseika Color & Chemicals Mfg. Co., Ltd.) by gravure printing to provide a picture layer partially in a patchwork form.

Then, a resin composition to be applied on the print layer was prepared as follows. Calcium carbonate $CaCO_3$ having a particle size of 3 μm and silica gel $SiO_2$ having a particle size of 10 μm were mixed in a mass ratio of 28:2 to constitute a filler. On the other hand, a binder was constituted from 100 mass parts of an acrylic polyol and 8.5 mass parts of a polyisocyanate. 52 mass parts of the filler, 48 mass parts of the binder, and 4 mass parts of an amino-modified silicone oil as a releasing agent were used to form a resin composition for forming a fine concavoconvex pattern.

The resin composition was applied on the whole surface of the PET film having the picture pattern by slit reverse coating and dried at 110° C. for 30 seconds and then aged at 60° C. for 3 days to obtain a shaping sheet.

By using the shaping sheet thus obtained, the same procedure as that in Example 2 was repeated to fabricate a melamine resin decorative board.

The surface of the shaping sheet in Example 3 is explained by referring to FIG. 18. The concavoconvex pattern of the shaping sheet fabricated in Example 3 is such that only the resin composition for forming a concavoconvex layer applied on the ink layer 3 that is formed of the repellent resin was repelled to form a concave pattern 14.

The decorative board obtained in Example 2 had a very fine concavoconvex pattern and enables design expression with a high-grade feeling. Further, the shaping sheet obtained in Example 1 had excellent durability and the surface shape and peelability (ease of peeling) after the shaping were not changed at all even after repeating molding 10 times.

The decorative board in Comparative Example 1 had good expression of a dynamic concavoconvex feeling but it failed to express a fine concavoconvex pattern. Further, the film had to be formed by using a thick sheet having elasticity from the viewpoint of requirements of production, leading to an increased cost. The durability and peelability of the shaping sheet were the same as those of the shaping sheet in Example 2.

Example 4

A permeation preventing layer 6 (primer layer) having a thickness of 3 μm was formed by gravure printing using a primer ink (acrylic ink "EBF Tuning Primer", manufactured by Showa Ink Manufacturing Co., Ltd.) all over the adhesion facilitation-treated surface of an already adhesion facilitation-treated polyester film ("A4100 (50 μm)", manufactured by Toyobo Co., Ltd.). On the whole surface of the resultant, a matted primer layer 15 having a thickness of 3 μm was formed by gravure printing using a matted clear ink ("GBS Clear", manufactured by Showa Ink Co., Ltd.).

GBS Clear had the following composition:

| | |
|---|---|
| Acrylic polyol | 30 mass parts |
| Matting agent (silica: average particle size of 2 μm) | 5 mass parts |
| Reactive silicone (single end amino group-modified) | 1 mass part |
| Polyisocyanate (HMDI based) | 10 mass parts |
| Solvent (ethyl acetate/methyl isobutyl ketone (MIBK) = 1/1) | 70 mass parts. |

Further, an electron beam-curable resin ("REB-N", manufactured by Dainichiseika Color & Chemicals Mfg. Co., Ltd.) was provided by gravure printing to a thickness of 2 μm so that a reverse plate of wood grain conduit pattern was formed on the primer layer. Here, the reverse plate means a pattern in which no printing is performed only on the conduit portion.

REB-N had the following composition:

| | |
|---|---|
| Urethane acrylate | 70 mass parts |
| Polyfunctional monomer (6-functional) | 5 mass parts |
| Matting agent (silica: average particle size of 3 μm) | 10 mass parts |
| Filler (fine silica: average particle size of 0.5 μm) | 5 mass parts |
| Releasing agent (silicone methacrylate) | 3 mass parts |
| Diluent solvent (isopropanol (IPA)) | 20 mass parts. |

The viscosity of the resin composition upon printing was 30 seconds as measured on a Zahn cup #3 viscometer. Then, the sample was hot-air dried at 80° C., and irradiated with an electron beam at an acceleration voltage of 175 kV and an irradiation dose of 30 kGy (3 Mrad) to cure the electron beam-curable resin composition to form a surface shaping layer 5, thus obtaining a shaping sheet.

Example 5

On about 4 sheets of a phenol resin-impregnated core paper, a melamine resin-impregnated sheet and then a an about 35 g/m$^2$ overlay paper impregnated with a melamine resin were laminated in order and the resultant laminate was sandwiched between two mirror-surfaced metal plates and the shaping sheet having a concavoconvex pattern on the surface thereof produced in Example 4 was inserted on the surface, and heat-pressed at a press pressure of 7.8 MPa (80 kg/cm$^2$) and 160° C. for 20 minutes. After leaving the molded article to cool to room temperature, the shaping sheet was peeled off to obtain a melamine resin decorative board having a fine concavoconvex pattern on the surface thereof.

Thus, a decorative board having excellent design properties with well-modulated lustrous portion and matted portion was obtained in which the portion where the conduit portion, that is, matted primer layer 15, was exposed is recognized as a matted portion (low luster region).

The decorative board obtained in Example 5 had a very fine concavoconvex pattern and enables design expression with a high-grade feeling. Further, the shaping sheet obtained in Example 4 had excellent durability and the surface shape and peelability (ease of peeling) after the shaping were not changed at all even after repeating molding 10 times.

Example 6

A penetration preventing layer 6 (primer layer) was formed by gravure printing of a primer ink (acrylic ink "EBF Tuning Primer", manufactured by Showa Ink Manufacturing Co., Ltd.) all over the adhesion facilitation-treated surface of a PET film ("Lumirrar (thickness of 50 μm and weight decrease of 0.65 wt %)", manufactured by Toray Industries Inc.).

Then, an ink (a urethane conduit ink "CONDUIT MINI (A)", manufactured by Inktech Inc.) was subjected to printing of a conduit portion of a wood grain pattern with a pattern plate to form an ink layer 3. Further, an electron beam-curable resin composition including an electron beam-curable resin ("REB-GE", manufactured by Dainichiseika Color & Chemicals Mfg. Co., Ltd.) to which 5 mass % of calcined kaolin particles and 2 mass % of reactive silicone methacrylate was added was applied to the ink layers in a coating amount of 4 g/m$^2$ by a gravure offset coating method. After the coating, an electron beam of acceleration voltage of 175 kV and an irradiation dose of 30 kGy (3 Mrad) was applied to cure the electron beam-curable resin composition to form a surface shaping layer 5, thus obtaining a shaping sheet. The shaping sheet is a film that has a convex pattern of which the surface of the surface shaping layer positioned on the portion just above the ink layer and a portion in the vicinity thereof were raised in a height of 1 to 3 μm and also expresses a fine wood grain with a high-grade feeling.

Example 7

On about 4 sheets of a phenol resin impregnated core paper, a melamine resin impregnated sheet and then an about 35 g/m$^2$ overlay paper impregnated with a melamine resin were laminated in order and the resultant laminate was sandwiched between two mirror-surfaced metal plates and the shaping sheet having a concavoconvex pattern on the surface thereof produced in Example 6 was inserted on the surface, and heat-pressed at 0.98 MPa and 160° C. for 20 minutes.

After leaving the molded article to cool to room temperature, the shaping sheet was peeled off to obtain a melamine resin decorative board having a fine concavoconvex pattern on the surface thereof.

The decorative board obtained in Example 7 had a very fine concavoconvex pattern and enables design expression with a high-grade feeling. Further, the shaping sheet obtained in Example 6 had excellent durability and the surface shape and peelability (ease of peeling) after the shaping were not changed at all even after repeating molding 10 times. Further, the surface of the molded decorative board had a convex pattern portion (portion where the concave pattern of the shaping sheet is shaped) and a concave portion (portion where the raised pattern 7 of the shaping sheet was shaped) sharply shaped even after molding was repeated 10 times, and the decorative board had a fine concavoconvex pattern in the concave pattern portion of the decorative board, and no change was observed at all. Further when the shaping sheet was repeatedly used, no contamination of the surface of the shaping sheet with impurities separated from the base material was observed.

Example 8

A primer ink (acrylic ink "EBF Tuning Primer", manufactured by Showa Ink Manufacturing Co., Ltd.) was subjected to gravure printing all over the adhesion facilitation-treated surface of an already adhesion facilitation-treated polyester film ("A4100 (50 μm)", manufactured by Toyobo Co., Ltd.) to form a primer layer.

Then, an ink layer was formed by subjecting an ink (a urethane conduit ink "CONDUIT MINI (A)", manufactured by Inktech Inc) to printing of a conduit portion of a wood grain pattern with a pattern plate to form an ink layer. Further, an electron beam-curable resin composition including an electron beam-curable resin ("REB-GE", manufactured by Dainichiseika Color & Chemicals Mfg. Co., Ltd.) to which 5 mass % of calcined kaolin particles and 2 mass % of reactive silicone methacrylate was added was applied to the ink layers in a coating amount of 4 g/m² by a gravure offset coating method. After the coating, an electron beam of acceleration voltage of 175 kV and an irradiation dose of 30 kGy (3 Mrad) was applied to cure the electron beam-curable resin composition to form a surface shaping layer, thus obtaining a shaping sheet. The shaping sheet is a film that has a convex pattern of which the surface of the surface shaping layer positioned on the portion just above the ink layer and a portion in the vicinity thereof were raised in a height of 1 to 3 μm and also expresses a fine wood grain with a high-grade feeling.

A decorative board was produced using the shaping sheet by the method as shown in FIG. 19. That is, an about 35 g/m² overlay paper impregnated with a melamine resin 25 and a print sheet 24 printed with an ink containing a pearl pigment were laminated as sandwiching a plurality of phenol resin-impregnated core papers 26 and the resultant laminate was sandwiched between two mirror-surface metal plates 22 and on a surface of this was inserted the shaping sheet 1 having a concavoconvex pattern formed on the surface thereof produced in Example 7 so that the surface shaping layer contacted the print sheet 24, and the resultant structure was heat-pressed at a press pressure of 7.8 MPa (80 kg/cm²) and 160° C. for 20 minutes. After leaving the molded article to cool to room temperature, the shaping sheet was peeled off to obtain a melamine resin decorative board having a fine concavoconvex pattern on the surface thereof and a pearl feeling.

The surface of the melamine resin decorative board had a sufficient pearl feeling and there occurred no transfer of the pearl pigment to the surface of the surface shaping sheet 1 and the mirror-surface metal plates 22, thus causing no contamination.

Comparative Example 2

A melamine resin decorative board was produced by repeating the same procedure as that in Example 8 except that the shaping sheet 1 was not used in Example 8. The pearl luster on the surface of the melamine resin decorative board was decreased and the pearl pigment was transferred to the surface of the mirror-surface metal plates 22, thus causing contamination.

Example 9

An interpaper reinforced paper for construction materials having a basis weight of 30 g/m² was used as a base material. On one side of this paper, a solid printing layer having a coating amount of 5 g/m² was applied with an ink containing an acrylic resin and nitrated cotton as binders and titanium white, red iron oxide, and lead yellow as colorants by gravure printing. On this layer, a print pattern layer of a wood grain pattern was formed with an ink containing nitrated cotton as a binder and a colorant whose major component was red iron oxide by gravure printing to obtain a decorative sheet layer. Then, after a urea-vinyl acetate adhesive was roll-coated on MDF of a base material, the resultant decorative sheet layer was affixed to the base material. After that, a polyester resin composition obtained by mixing an unsaturated polyester and a peroxide was applied on the whole upper surface of the decorative sheet layer in a coating amount of 200 g/m². On this, the shaping sheet obtained in Example 8 was covered and abutted while registering with register marks. Then, the resultant was rolled and defoamed 5 times at 10 kgf/930 m/m using a rubber roll and while keeping the position so as not to be out of alignment, the structure was heated at 40° C. for 2 hours and the polyester resin was cured at room temperature. After the curing, the shaping sheet was peeled off to obtain a polyester decorative board having a fine concavoconvex pattern on the surface thereof.

The polyester decorative board obtained in Example 9 had excellent molding reproducibility and had a surface roughness of 4.5 μm on the first run and 4.2 μm on the 10-th run, which were substantially the same. Further, the peeling speed on the first shaping was 100 gr/inch or less, which was good and the peeling speed on the 10-th shaping was 100 gr/inch or less, which was substantially the same as the peeling speed on the first time, thus giving good results.

The invention claimed is:

1. A shaping sheet, comprising a base material having at least an ink layer provided on the whole surface thereof and a surface shaping layer that is present on the ink layer, contacts the ink layer, and covers the whole surface of the ink layer, wherein the surface shaping layer is a crosslinked and cured product of a curable resin composition that contains calcined kaolin particles having an average particle size of 0.5 to 2 μm and silicone (meth)acrylate, and the surface shaping layer has a concavoconvex pattern on a surface thereof, wherein the ink layer contains an ink having a non-crosslinked urethane resin as a binder, and wherein the non-crosslinked urethane resin has an average molecular weight of about 1,000 to 50,000 and a glass transition temperature of about −70 to −40° C., and wherein the shaping sheet further comprises an interaction region in said surface shaping layer and formed of material of the ink layer and material of the curable resin composition of the surface shaping layer, said interaction region being in contact with and extending from said ink layer.

2. The shaping sheet according to claim 1, wherein the ink that constitutes the ink layer contains as binders the non-crosslinked urethane resin and an unsaturated polyester resin.

3. The shaping sheet according to claim 1, wherein in said interaction region a resin component of the ink layer and the material of the curable resin composition have undergone interactions to form a suspension state.

4. The shaping sheet according to claim 1, wherein the ink of the ink layer has characteristics such that it can interact with the surface shaping layer so as to form an interaction region in the surface shaping layer, extending from the ink layer.

5. The shaping sheet according to claim 1, said shaping sheet having a characteristic that it can be used to form a concavoconvex pattern on a surface of a thermosetting resin decorative board.

6. The shaping sheet according to claim 1, wherein the curable resin composition is an ionizing radiation-curable resin composition.

7. The shaping sheet according to claim 6, wherein the ionizing radiation-curable resin composition is an electron beam-curable resin composition.

8. The shaping sheet according to claim 1, wherein the calcined kaolin particles have been treated with a silane coupling agent.

9. The shaping sheet according to claim 1, wherein a thickness of the surface shaping layer is 2 to 20 μm, and the calcined kaolin particles have an average particle size, $d_A$, within the range of 0.5 to 2.0 μm, that satisfies a relationship represented by the following formula (I):

$$1.05 \times t_M \leq d_A \leq 1.25 \times t_M$$

where $t_M$ is a maximum thickness of the surface protective layer positioned just above the ink layer.

10. The shaping sheet according to claim 2, wherein a coefficient of variation of particle size distribution of the calcined kaolin particles is 30% or less.

11. The shaping sheet according to claim 10, wherein a content of the calcined kaolin particles in the surface shaping layer is 2 to 20 mass %.

12. A shaping sheet, comprising a base material made of a polyester film having at least partly thereon an ink layer, and a surface shaping layer that is present above the ink layer, contacts the ink layer, and covers the whole surface over a region in which the ink layer is formed and a region in which the ink layer is not formed, wherein the surface shaping layer is a crosslinked and cured product of an ionizing radiation-curable resin composition and the base material shows a weight decrease of 1.0 mass % or less when immersed in xylene at 140° C. for 24 hours, and wherein the shaping sheet further comprises an interaction region in said surface shaping layer and formed of material of the ink layer and material of the ionizing radiation-curable resin composition of the surface shaping layer, said interaction region being in contact with and extending from said ink layer.

13. The shaping sheet according to claim 12, wherein the surface of the surface shaping layer that is positioned just above the ink layer and above a portion in the vicinity thereof has a convex pattern.

14. The shaping sheet according to claim 12, wherein the ink layer contains an ink containing a non-crosslinked urethane resin as a binder and the ionizing radiation-curable resin composition contains a (meth)acrylate monomer.

15. The shaping sheet according to claim 12, wherein said weight decrease of the base material is 0.30 to 0.65 mass %.

16. The shaping sheet according to claim 12, said shaping sheet having a characteristic that it can be used to form a concavoconvex pattern on a surface of a thermosetting resin decorative board.

* * * * *